(12) United States Patent
Phillips, Jr.

(10) Patent No.: US 7,568,437 B2
(45) Date of Patent: Aug. 4, 2009

(54) METHOD AND DEVICE FOR DISPENSING A FERTILIZER, PESTICIDE, FUNGICIDE, HERBICIDE, INSECTICIDE, CHEMICAL, OR THE LIKE MATERIAL

(76) Inventor: J. Andrew Phillips, Jr., 610 Tony Tank La., Salisbury, MD (US) 21804

( * ) Notice: Subject to any disclaimer, the term of this patent is extended or adjusted under 35 U.S.C. 154(b) by 324 days.

(21) Appl. No.: 11/281,455

(22) Filed: Nov. 18, 2005

(65) Prior Publication Data

US 2007/0113762 A1    May 24, 2007

(51) Int. Cl.
*A01C 7/00* (2006.01)
*A01C 9/00* (2006.01)
*A01C 23/00* (2006.01)
*A01C 23/02* (2006.01)

(52) U.S. Cl. .................. 111/7.2; 111/127; 111/170; 111/900

(58) Field of Classification Search ................ 141/237; 239/152–154, 588; 222/175, 548, 547, 566, 222/444, 447, 449, 451, 434–440, 482, 465.1, 222/540; 111/7.1–7.3, 170, 200, 900, 127, 111/92, 94, 95; 224/269, 148.7, 153, 209, 224/210, 213, 658; 15/327.5, 405
See application file for complete search history.

(56) References Cited

U.S. PATENT DOCUMENTS

| 260,373 | A | 7/1882 | Erwin |
| 659,233 | A | 10/1900 | Hoyer |
| 677,667 | A | 7/1901 | Kirschen |
| 1,084,564 | A | 1/1914 | Sertic |
| 1,911,692 | A | 5/1933 | Jalandoni |
| 2,005,598 | A | 6/1935 | Smith |
| 2,065,678 | A | 12/1936 | Fish, Jr. |
| 2,182,878 | A | 12/1939 | Pipenhagen |
| 2,370,744 | A | 3/1945 | Molinare |
| 3,014,443 | A | 12/1961 | Keyser et al. |
| 3,170,422 | A | 2/1965 | Gregory |
| 3,771,474 | A | 11/1973 | Elston |
| 3,815,526 | A | 6/1974 | Christopherson |
| 4,246,854 | A | 1/1981 | Lempa, Jr. |
| 4,614,160 | A | 9/1986 | Curlett |
| 5,339,994 | A | 8/1994 | Nuila |
| 5,503,090 | A | 4/1996 | Guzan |
| 5,944,231 | A | 8/1999 | Nuila |
| 2004/0016475 | A1 | 1/2004 | Navarro |

FOREIGN PATENT DOCUMENTS

FR    2566227    12/1985

OTHER PUBLICATIONS

U.S. Appl. No. 11/281,443, filed Nov. 18, 2005.
Office Action dated Aug. 7, 2008, issued in co-pending U.S. Appl. No. 11/281,443, filed Nov. 18, 2005.

*Primary Examiner*—Christopher J. Novosad
(74) *Attorney, Agent, or Firm*—Dinesh Agarwal, P.C.

(57) ABSTRACT

A method and device for dispensing a predetermined or measured amount of a fertilizer, pesticide, fungicide, herbicide, insecticide, chemical, or the like material includes a housing with a plurality of chambers in communication with each other. A plurality of valves are provided for opening or restricting the flow between the chambers. One of the chambers includes a measuring chamber, and a second of the chambers includes a storage chamber disposed downstream of the measuring chamber. A dispensing chamber is disposed downstream of the storage chamber. A material discharge valve is operably associated with the dispensing chamber for discharging the material from the housing.

97 Claims, 16 Drawing Sheets

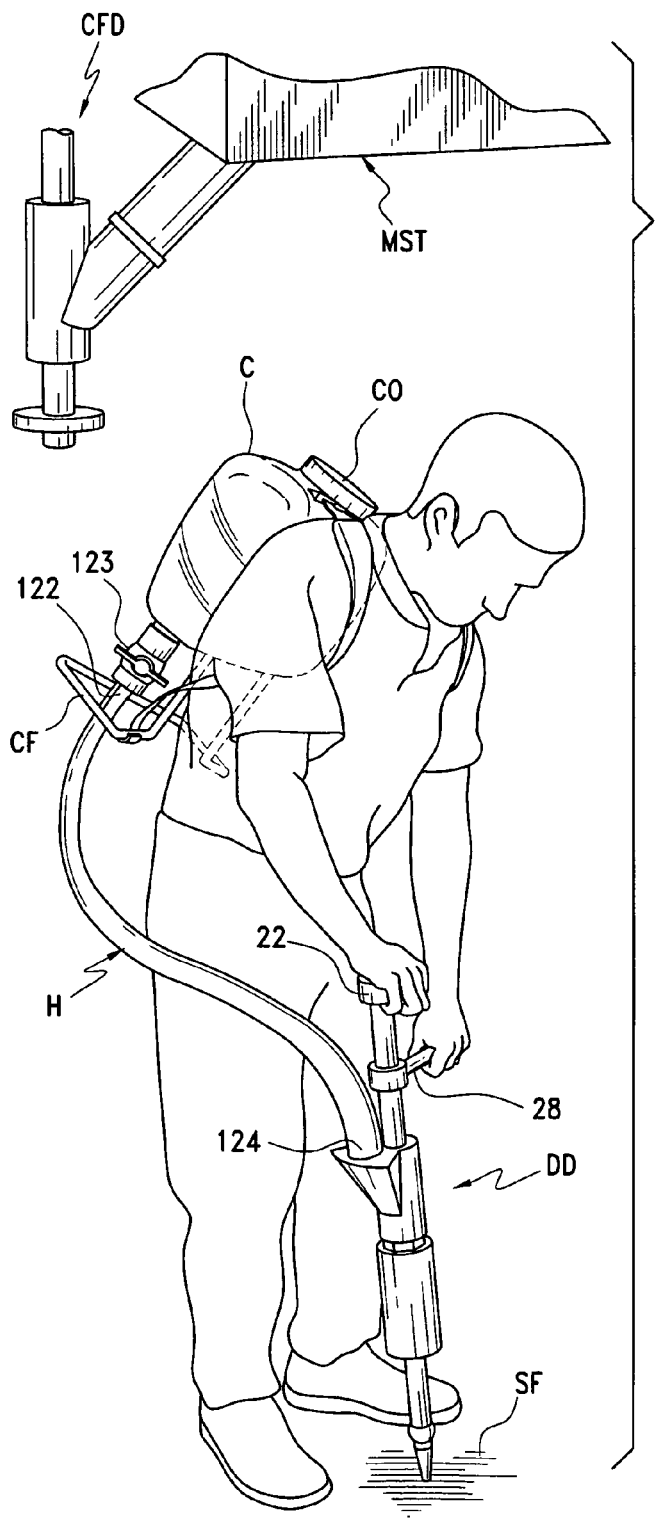
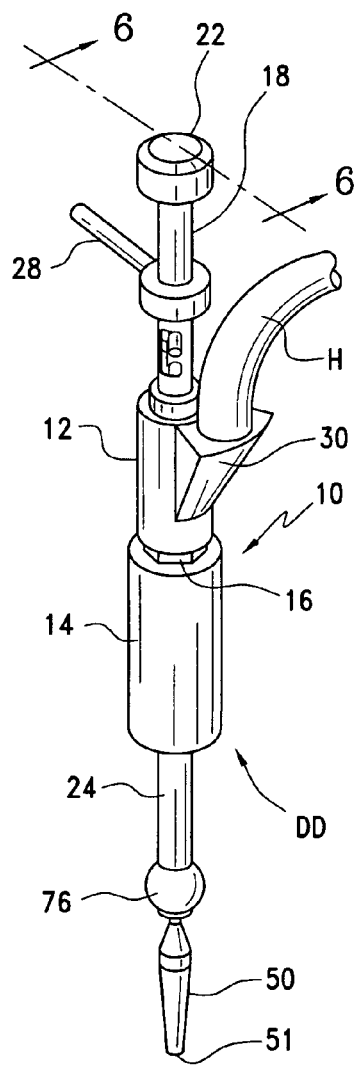
FIG. 2
FIG. 1

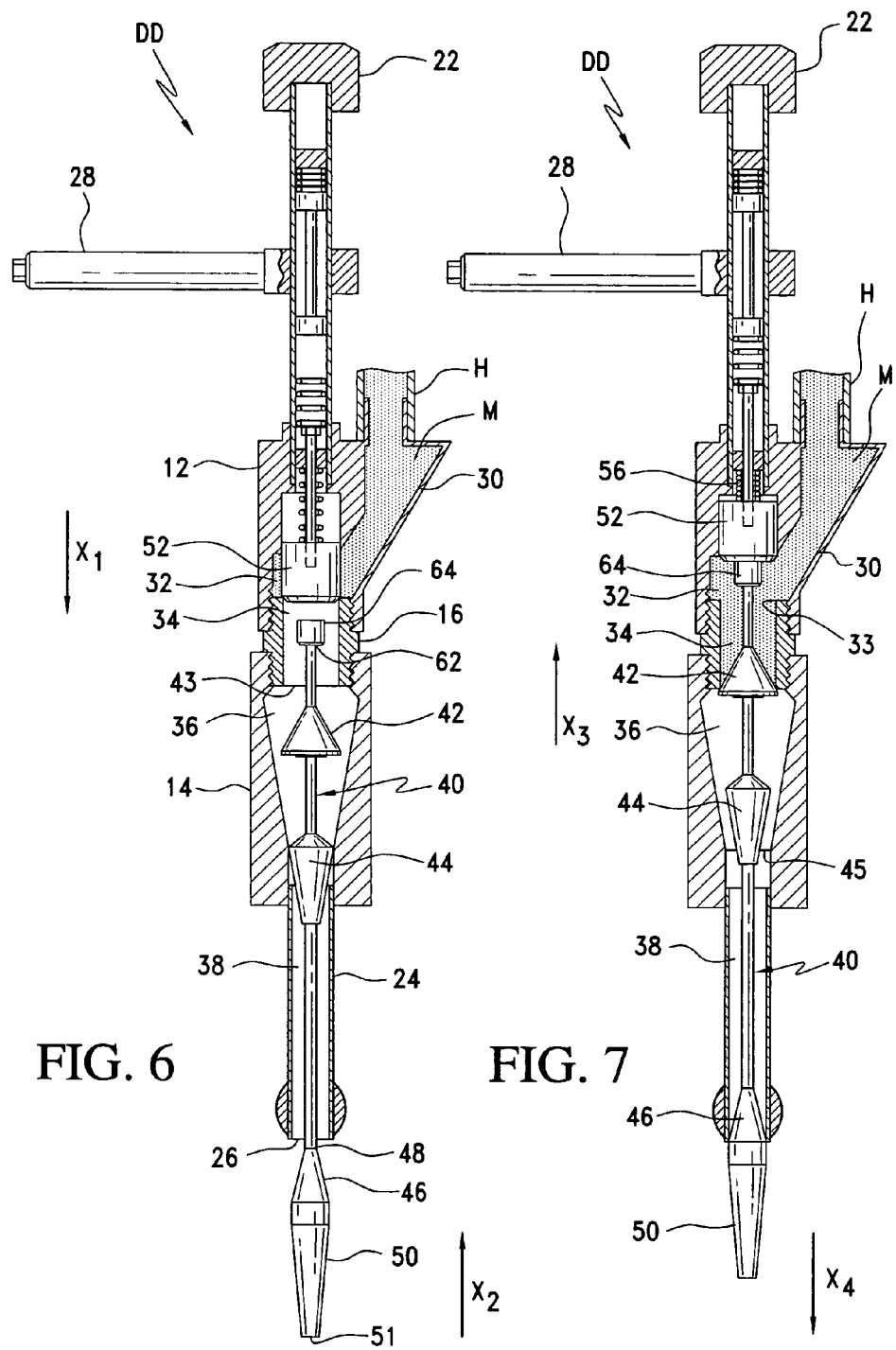

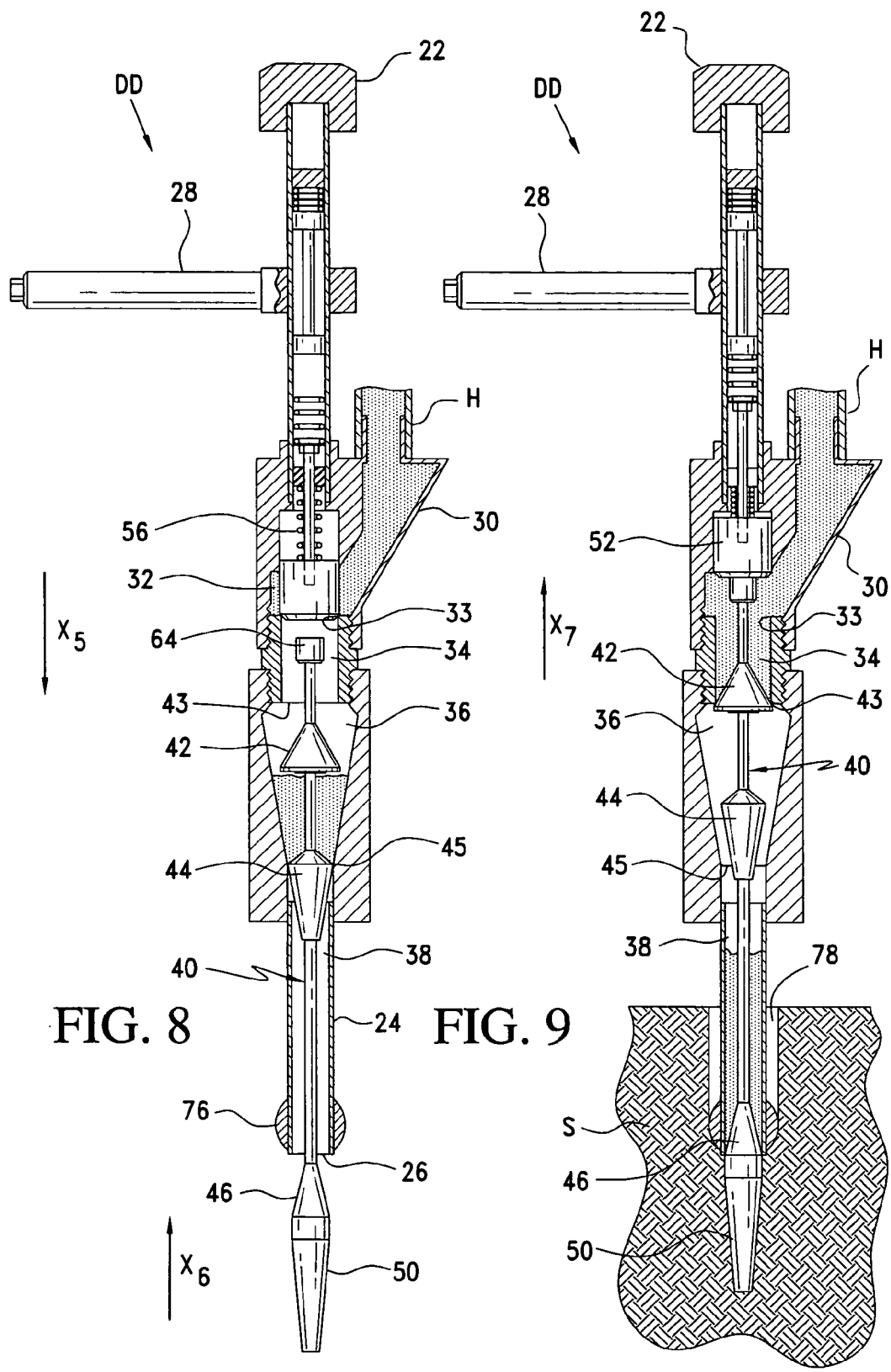

$D_1 > D_2 > D_3$

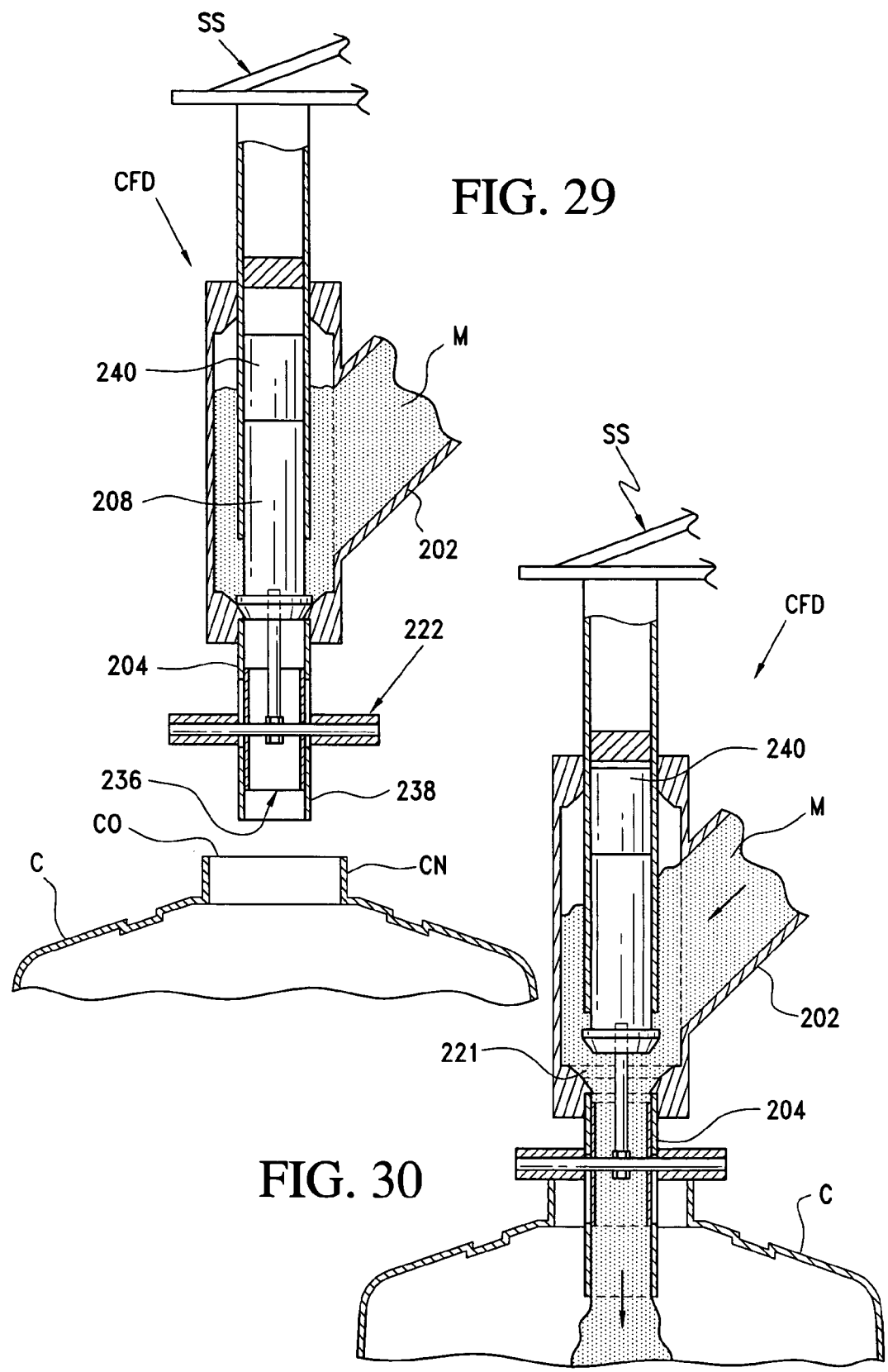

$D_4 < D_5$

METHOD AND DEVICE FOR DISPENSING A FERTILIZER, PESTICIDE, FUNGICIDE, HERBICIDE, INSECTICIDE, CHEMICAL, OR THE LIKE MATERIAL

FIELD AND BACKGROUND OF THE INVENTION

The present invention is generally directed to applying fertilizers, and more particularly to a method and device for dispensing a fertilizer, pesticide, fungicide, herbicide, insecticide, chemical, or the like material above or below a soil surface in both container-grown and field-grown plants, shrubs, trees, etc.

It is well known in the agriculture and farming industry that proper and timely application of fertilizer or other chemicals is crucial for the proper and healthy growth of the plants or crops. As a result, accurate dispensing of a fertilizer or other chemical must be carried out in a careful and effective manner to ensure proper fertilizer application to obtain healthy and properly grown plants or crops.

Although proper application of fertilizers or other chemicals is important, whether growing a seasonal crop in a large field, or a small garden in a backyard, it is particularly important in growing plants in a nursery-like setting where the plants are grown to various heights over a long period of time for future sale. In particular, the plants may be grown in containers or various size pots, open fields, or in greenhouses. These plants are grown to different heights and/or maturity for sale to different customers. For example, one particular species or variety of a plant may be grown to a short height for sale to a residential customer, and grown to a full size for sale to commercial customers. The growing of plants to different heights requires a plant grower to maintain the plants in healthy condition for a longer period before sale. Growing and maintaining these plants, whether in containers or in a field, requires constant and steady availability of the fertilizer or other chemicals in the soil for the plants to grow properly.

The conventional practice of applying a fertilizer, particularly in the nursery industry, is to carry the material in a bucket and dispense it by using a measuring spoon. This method leads to improper and precise application in that a different amount is measured and dispensed in each application. In other words, the amounts measured and applied in a repeated application are never the same. In addition, this technique is labor-intensive, time consuming, and physically very challenging for the user.

Moreover, the conventional techniques of applying a fertilizer or other chemical topically to a plant, whether in a field or in a container, leads to tremendous loss by irrigation or rainfall. Also, the applied material can be lost when the plants "blow-over" in the wind and/or due to evaporation. Plant "blow-over" and the subsequent lost of fertilizer is a tremendous problem in the nursery industry. This problem is exaggerated from an economic standpoint if the material is of time-release nature, undesirable as it tends to be more expensive and does not require frequent applications. Additionally, blown-over fertilizer can lead to soil and/or ground-water contamination.

Various prior art devices are available as shown in U.S. Pat. Nos. 260,373; 659,233; 677,667; 1,084,564; 1,911,692; 2,005,598; 2,065,678; 2,182,878; 2,370,744; 3,014,443; 3,170,422; 3,771,474; 3,815,526; 4,246,854; 4,614,160; 5,339,994; 5,503,090; 5,944,231; and French 2,566,227.

The conventional devices suffer from various disadvantages, such as not having a measuring or metering mechanism, having a slow or imprecise discharge, extended charging time in-between the applications, complicated in construction, etc. Therefore, there is a need in the industry for a method and device for dispensing a fertilizer, pesticide, fungicide, herbicide, insecticide, chemical or the like material which is simple in construction, easy to use, ergonomically designed, discharges material fast and in more precise amounts, and improves user efficiency.

Another disadvantage associated with conventional devices is that when the supply of the material is depleted from the device itself, or from a container carried on a user's back, the device or the container must be refilled by taking the container off the user's back or the device itself, or the device must be opened for a refilling operation. This leads to significant down time and user inefficiency. Accordingly, there is a need in the industry for a device for quickly filling or refilling a container with a material, such as a fertilizer, pesticide, fungicide, herbicide, insecticide, chemical or the like material.

OBJECTS AND SUMMARY OF THE INVENTION

An object of the present invention is to provide a method and device for dispensing a fertilizer, pesticide, fungicide, herbicide, insecticide, chemical, or the like material which overcome the drawbacks associated with conventional devices or techniques.

Another object of the present invention is to provide a method and device for filling a container with a fertilizer, pesticide, fungicide, herbicide, insecticide, chemical, or the like material.

Yet another object of the present invention is to provide a method and device for dispensing a fertilizer, pesticide, fungicide, herbicide, insecticide, chemical, or the like particulate or granular material above or below a soil surface in container-grown or field-grown plants, shrubs, trees, etc.

Still yet another object of the present invention is to provide a method and device for dispensing a fertilizer, pesticide, fungicide, herbicide, insecticide, chemical or the like material which can be effectively used to dispense a predetermined amount of material consistently and repeatedly in each cycle of operation.

Still yet another object of the present invention is to provide a method and device for dispensing a fertilizer, pesticide, fungicide, herbicide, insecticide, chemical or the like material which maintains consistency in dispensing the same amount of material by measuring or metering the material prior to dispensing. This eliminates guesswork and over- or under-dispensing of the material in each cycle of operation.

An additional object of the present invention is to provide a method and device for dispensing a fertilizer, pesticide, fungicide, herbicide, insecticide, chemical, or the like material wherein the material is injected below the soil surface to eliminate loss due to irrigation, rainfall, spillage, evaporation, sunlight damage, etc. This eliminates costly loss of the material and ensures healthy plant growth by maintaining a continuous and consistent supply of the material in the soil at all times. It is known that granular fertilizers, particularly in pellet form, and dry chemicals applied to plants perform better and are more consistent when in full contact with the soil and kept at a more consistent moisture level. The method and device of the present invention allow consistent moisture control to be present that leads to significantly improved plant response in terms of growth.

Yet an additional object of the present invention is to provide a method and device for dispensing a fertilizer, pesticide, fungicide, herbicide, insecticide, chemical, or the like material wherein the material is carried in a back-supported container and is applied standing upright. This leads to fast and more efficient dispensing while eliminating or significantly reducing user fatigue.

A further object of the present invention is to provide a method and device for dispensing a fertilizer, pesticide, fungicide, herbicide, insecticide, chemical, or the like material wherein the material is repetitively dispensed above or below a soil surface by automatically measuring and charging/priming the device during each cycle of operation. The material to be discharged or disposed is immediately available at the discharge end of the device thereby eliminating or significantly reducing flow or travel time within the device prior to discharge.

Yet a further object of the present invention is to provide a method and device for dispensing a fertilizer, pesticide, fungicide, herbicide, insecticide, chemical, or the like material wherein the same amount of material is quickly and repetitively dispensed above or below a soil surface. Since the device is automatically charged with a measured amount of material during a previous cycle of operation, the next discharge of material is immediately available for dispensing without delay. This eliminates or significantly reduces any drag or delay in-between the cycles of operation. In other words, as soon as a measured amount of material is dispensed above or below a soil surface, the device is ready to dispense the next material discharge. Accordingly, the user can go from plant to plant with the device recharging as fast as, or faster than the user can reach the next plant for a dispensing operation.

Still yet a further object of the present invention is to provide a method and device for dispensing a fertilizer, pesticide, fungicide, herbicide, insecticide, chemical, or the like material wherein the dwell time of the material within the device, before it is ready for a discharge, is eliminated or significantly reduced to no more than a few seconds, and preferably no more than three seconds.

An additional object of the present invention is to provide a method and device for dispensing a fertilizer, pesticide, fungicide, herbicide, insecticide, chemical, or the like material wherein any clumping, sticking, or bridging of the material, generally caused by irregular shape of the granules or pellets, is eliminated or significantly reduced.

Yet an additional object of the present invention is to provide a method and device for dispensing a fertilizer, pesticide, fungicide, herbicide, insecticide, chemical, or the like material which is designed and constructed to improve the flow of the material within the device by eliminating or significantly reducing clumping, sticking, or bridging of the material that could lead to malfunctioning, jamming, or stopping of the device.

Still yet an additional object of the present invention is to provide a method and device for dispensing the fertilizer, pesticide, fungicide, herbicide, insecticide, chemical, or the like material wherein a free-floating plunger keeps the material from clumping, sticking, bridging, etc. This also improves the flow of the material from and within the device itself.

Still yet an additional object of the present invention is to provide a method and device for dispensing the fertilizer, pesticide, fungicide, herbicide, insecticide, chemical, or the like material wherein the material flows within and out of the device by gravity. The device is simple in construction and design and therefore easy and inexpensive to manufacture. Further, the device eliminates the use of any bearings, guides, cross-braces, and/or hydraulic mechanism, etc., thereby eliminating or significantly reducing lubrication, repair, and/or maintenance due to malfunctioning, jamming, stopping, etc.

Another object of the present invention is to provide a method and device for filling a back-supported container without the need first to remove the container from the back.

Yet another object of the present invention is to provide a method and device for hands-free filling of a container, such as a back-supported container.

An additional object of the present invention is to provide a wall or overhead-mounted device for quick and hands-free filling of a container, such as a back-supported container, with a material by gravity. In particular, the device can be mounted on a part of an immovable structure, such as a building, or a movable structure, such as a tractor, trailer, or the like.

A further object of the present invention is to provide a device for filling a container, such as a back-supported container, with a fertilizer, pesticide, fungicide, herbicide, insecticide, chemical, or the like material for dispensing above or below a soil surface.

In summary, the main object of the present invention is to provide a method and device for dispensing a fertilizer, pesticide, fungicide, herbicide, insecticide, chemical, or the like material above or below a soil surface in the same predetermined, measured amounts repeatedly and consistently from one application to the next, without clumping, sticking or bridging of the material. The material is fed into the device from a back-supported container which can be easily and quickly filled or refilled by a device that allows for hands-free filling and without the need first to remove the container from the user's back.

One of the above objects is met, in part, by the present invention which in one aspect includes a device for dispensing a predetermined or measured amount of a fertilizer or the like material. The device includes a housing with a plurality of chambers in communication with each other. A plurality of valves are provided for opening or restricting the flow between the chambers. One of the chambers includes a measuring chamber, and a second of the chambers includes a storage chamber disposed downstream of the measuring chamber. A dispensing chamber is disposed downstream of the storage chamber. A material discharge valve is operably associated with the dispensing chamber for discharging the material from the housing.

Another aspect of the present invention includes a device for repetitively dispensing a predetermined or measured amount of a fertilizer or the like material above or below a soil surface. The device includes a housing with a measuring chamber, a storage chamber, and a dispensing chamber in communication with each other. A plunger extends through the measuring, storage and dispensing chambers. A measuring valve is provided for opening or restricting the flow of a material between the measuring and storage chambers. A dispensing valve is provided for opening or restricting the flow of the material between the storage and dispensing chambers. A discharge valve is provided for discharging or restricting the flow of the material out of the dispensing chamber. An applicator is provided for engaging a soil surface during a dispensing operation.

Another aspect of the present invention includes a device for repetitively dispensing a predetermined or measured amount of a fertilizer or the like material above or below a soil surface by automatically measuring and charging the device during each cycle of operation. The device includes a housing with a measuring chamber, a storage chamber, and a dispensing chamber in communication with each other. The storage chamber is disposed between the measuring and dispensing chambers, and a hopper is disposed externally of the housing for feeding a material to the measuring chamber. A plunger extends through the measuring, storage, and dispensing chambers and is movable between first and second positions. A measuring valve operably associated with the plunger is provided for opening or restricting the flow of the material between the measuring and storage chambers. A dispensing valve operably associated with the plunger is provided for opening or restricting the flow of the material between the storage and dispensing chambers. A discharge valve operably associated with the plunger is provided for discharging or restricting the flow of the material out of the dispensing chamber. The measuring, dispensing, and discharge valves are operable generally simultaneously when the plunger is moved between the first and second positions. An applicator is provided for engaging a soil surface during a dispensing operation.

Another aspect of the present invention includes a device for repetitively dispensing a predetermined or measured amount of a fertilizer or the like material above or below a soil surface. The device includes a housing with a measuring chamber and a dispensing chamber in communication with each other. A hopper is provided for feeding a material to the measuring chamber. A plunger extends through the measuring and dispensing chambers and is movable between first and second positions. A feeder valve is provided for opening or restricting the flow of the material between the hopper and the measuring chamber. A measuring valve operably associated with the plunger is provided for opening or restricting the flow of the material between the measuring and dispensing chambers. A discharge valve operably associated with the plunger is provided for discharging or restricting the flow of the material out of the dispensing chamber. An applicator is provided for engaging a soil surface during a dispensing operation.

Another aspect of the present invention includes a device for repetitively dispensing a predetermined or measured amount of a fertilizer or the material above or below a soil surface. The device includes a dispenser for measuring and dispensing a material, a container for carrying the material, a conduit for supplying the material from the container to the dispenser. The conduit includes first and second ends operably connected to the container and the dispenser, respectively. The inside diameter of the second end of the conduit is larger than the diameter of the first end thereof. The dispenser includes a housing with a plurality of chambers in communication with each other, and a plurality of valves for opening or restricting the flow of the material between the chambers. One of the chambers includes a measuring chamber and a second of the chambers includes a storage chamber disposed downstream of the first chamber. A dispensing chamber is disposed downstream of the storage chamber, and a discharge valve is operably associated with the dispensing chamber for discharging the material from the housing.

Another aspect of the present invention includes a device for repetitively dispensing a predetermined or measured amount of a fertilizer or the material above or below a soil surface. The device includes a dispenser for measuring and dispensing a material, a container for carrying the material, a conduit for supplying the material from the container to the dispenser. The conduit includes first and second ends operably connected to the container and the dispenser, respectively. The inside diameter of the second end of the conduit is larger than the diameter of the first end thereof. The dispenser includes a housing with a plurality of chambers in communication with each other, a plunger extending through the measuring, storage, and dispensing chambers, a measuring valve for opening or restricting the flow of the material between the measuring a storage chambers, a dispensing valve for opening or restricting the flow of the material between the storage and dispensing chambers, a discharge valve for discharging or restricting the flow of the material out of the dispensing chamber, and an applicator for engaging a soil surface during a dispensing operation.

Another aspect of the present invention includes a method of repetitively dispensing a predetermined or measured amount of a fertilizer or the like material above or below a soil surface by automatically measuring and charging a device during each cycle of operation, which includes providing a device having i) measuring, storage, and dispensing chambers in communication with each other, ii) a plunger extending through the measuring, storage, and dispensing chambers and movable between first and second positions, iii) and an applicator operably connected to the plunger for engaging a soil surface during a dispensing operation, and iv) a hopper for feeding a material to the measuring chamber. A material is fed to the measuring chamber by moving the plunger to the second position, measured, and held in the measuring chamber. The measured material is moved into the storage chamber by moving the plunger to the first position, and to the dispensing chamber by moving the plunger to the second position. The measured material is then dispensed from the device by moving the plunger to the first position.

Another aspect of the present invention includes a method of repetitively dispensing a predetermined or measured amount of a fertilizer or the material above or below a soil surface by automatically measuring and charging a device during each cycle of operation, which includes providing a device having i) measuring and dispensing chambers in communication with each other, ii) a free-floating plunger extending through the measuring and dispensing chambers and movable between first and second positions, iii) an applicator operably connected to the plunger for engaging a soil surface during a dispensing operation, and iv) a hopper for feeding a material to the measuring chamber. A material is fed to the measuring chamber by moving the plunger to the second position, measured, and held in the measuring chamber. The measured material is moved into the dispensing chamber and dispensed therefrom by moving the plunger to the first position.

Another aspect of the present invention includes a wall-mounted device for filling a container with a fertilizer or the like material by gravity. The device includes a housing with an inlet and an outlet, a valve for opening or restricting a flow between the inlet and outlet and having open and closed positions, and an actuator disposed downstream of the inlet for actuating the valve between the open and closed positions, wherein the actuator is operated by a container to be filled with a material.

Another aspect of the present invention includes an overhead-mounted device for hands-free filling of a back-supported container with a fertilizer or the like material by gravity. The device includes a housing with an inlet and an outlet, a valve for opening or restricting a flow between the inlet and outlet and having open and closed positions, and an actuator slidably disposed about the outlet for actuating the valve between the open and closed positions and operated by a back-supported container to be filled with a material, wherein when the container is brought into engagement with the actuator and is moved toward the valve, the actuator slides about the outlet thereby opening the valve.

Another aspect of the present invention includes a method of filling a container with a fertilizer or the like material by gravity, which includes providing a wall-mounted device in communication with a tank for storing a material. The device includes i) a housing including an inlet and an outlet, ii) a valve for opening or restricting a flow between the inlet and outlet and having open and closed positions, and iii) an actuator disposed about the outlet for actuating the valve between the open and closed positions. The container is brought adjacent the device to engage the actuator. The actuator is operated by moving the container toward the valve thereby opening the valve and allowing the material to flow from the tank to the container through the inlet and outlet.

Another aspect of the present invention includes a method of hands-free filling of a back-supported container with a fertilizer or the like material by gravity, which includes providing an overhead-mounted device in communication with a tank for storing a material. The device includes i) a housing including an inlet and an outlet, ii) a valve for opening or restricting a flow between the inlet and outlet and having open and closed positions, and iii) an actuator slidably disposed about the outlet conduit for actuating the valve between the open and closed positions. The container is brought adjacent the device to engage the actuator. The actuator is operated by moving the container toward the valve thereby opening the valve and allowing the material to flow from the tank to the container through the inlet and outlet.

BRIEF DESCRIPTION OF THE DRAWINGS

One of the above and other objects, novel features and advantages of the present invention will become apparent from the following detailed description of the preferred embodiment(s) invention, as illustrated in the drawings, in which:

FIG. 1 is a perspective view of a dispensing device of the present invention;

FIG. 2 illustrates the dispensing device of the present invention in use with other associated components;

FIG. 6 is a sectional view taken along line 6-6 of FIG. 1;

FIGS. 7-11 are views similar to FIG. 6, showing various stages in priming and operating the dispensing device of the present invention;

FIGS. 29-30 are views similar to FIGS. 27-28, showing an alternative embodiment of the device for filling a container;

In the Figures and description, like reference numerals are used to denote similar elements or features.

DETAILED DESCRIPTION OF THE PREFERRED EMBODIMENT(S) OF THE INVENTION

Figure 3:
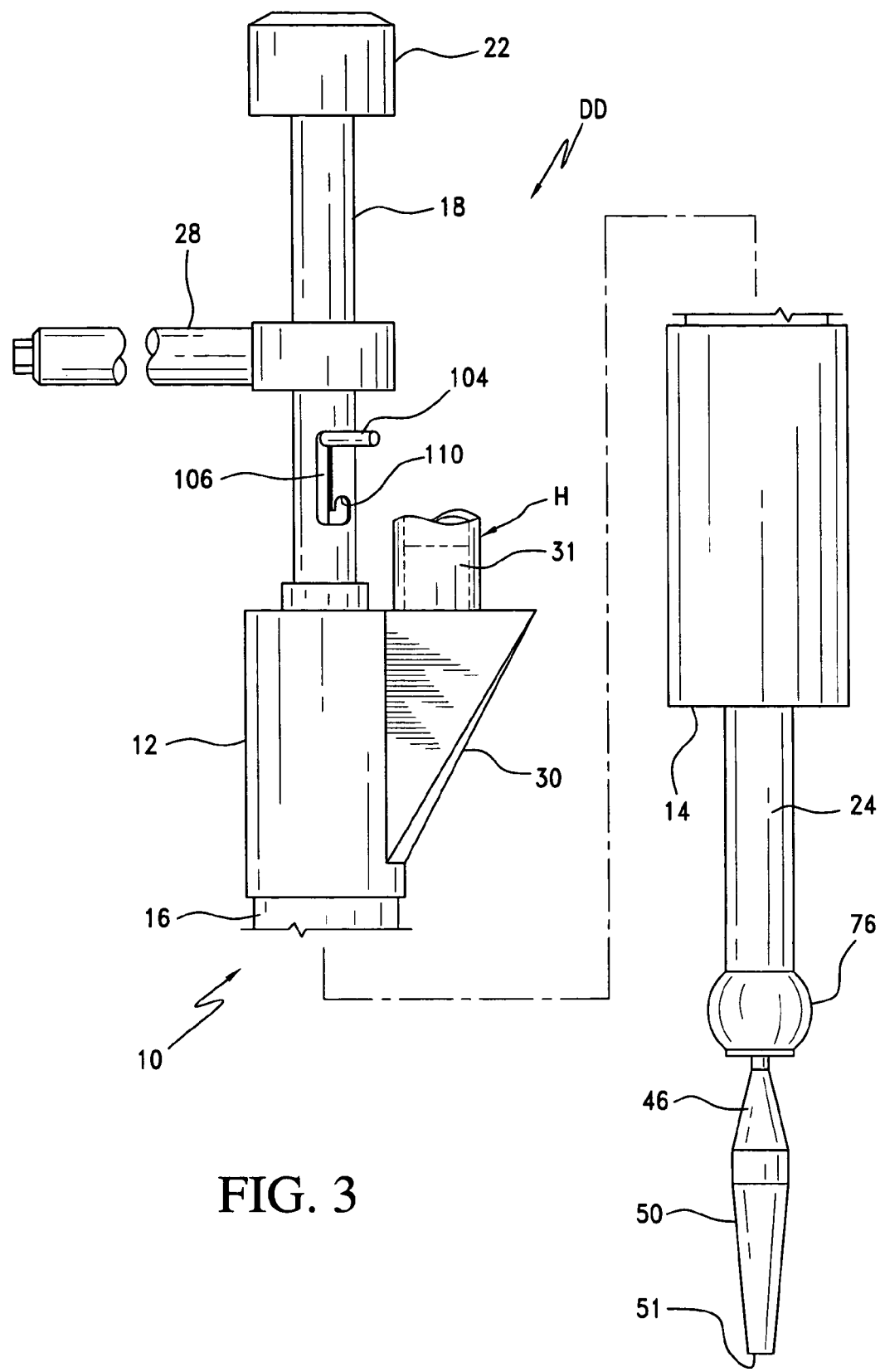
FIG. 3 is an enlarged front elevational view of the dispensing device shown in FIG. 1.
Figure 4:
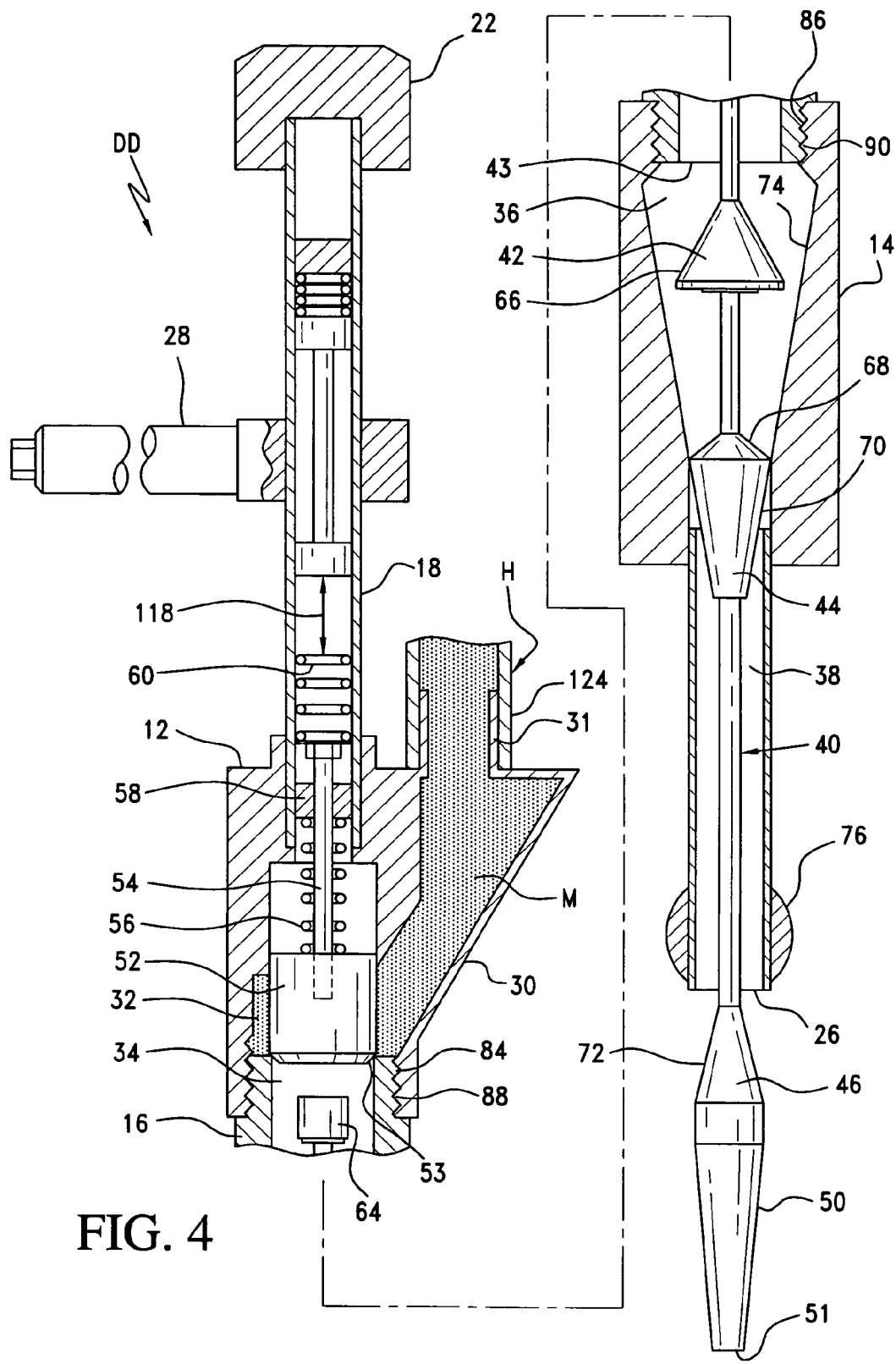
FIG. 4 is a slightly enlarged vertical cross-sectional view of the dispensing device of FIG. 3, shown in a first priming stage.
Figure 5:
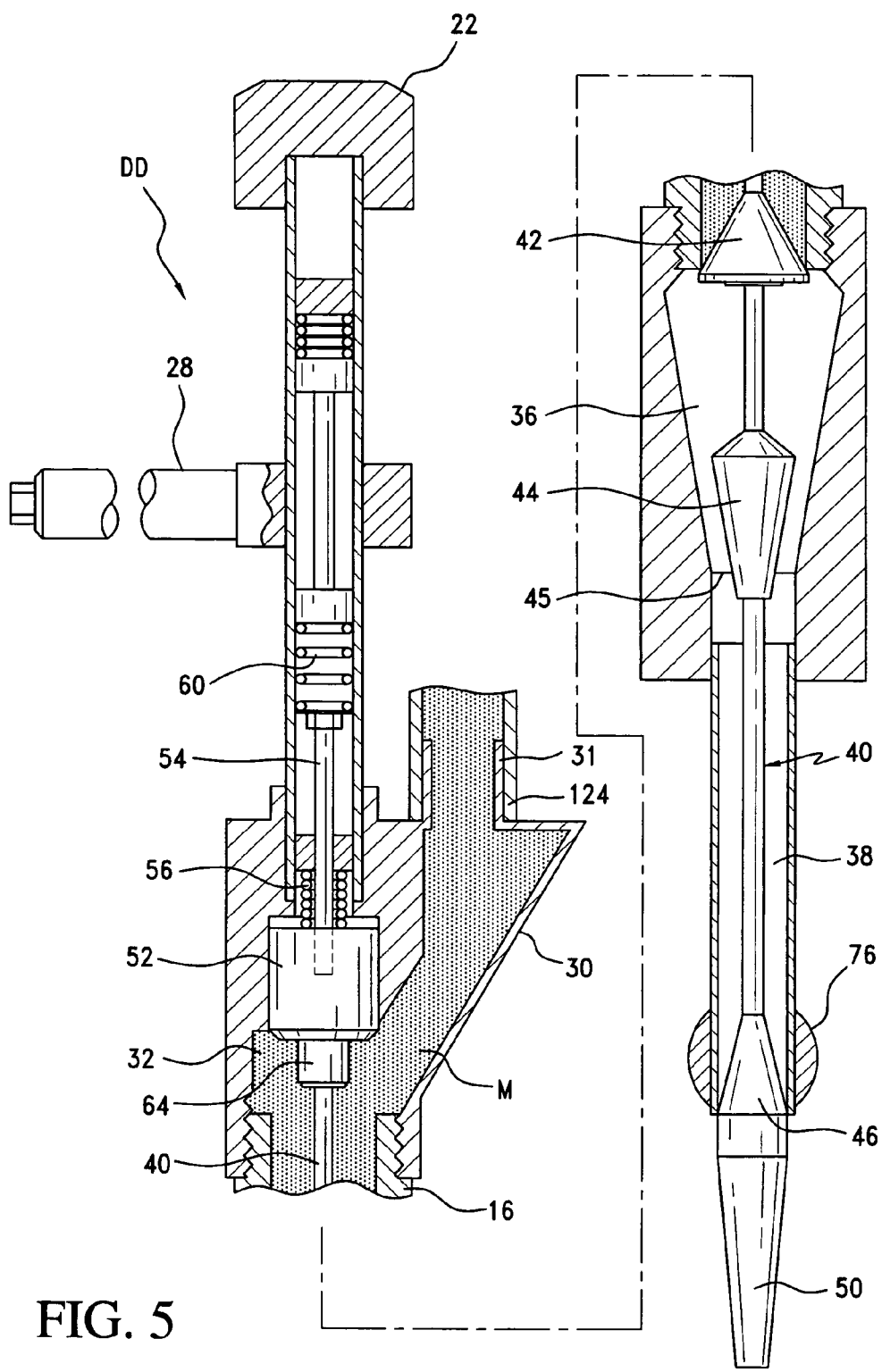
FIG. 5 is a view similar to FIG. 4, showing the dispensing device in a second priming stage.

As best shown in FIGS. 1 and 3, a dispensing device DD, in accordance with the present invention, is in the form of a housing 10 with upper and lower blocks 12 and 14, respectively, connected by a measuring module 16. An upper pipe or tube 18 extends upwardly from the upper block 12 and includes a knob 22. A lower pipe 24 extends downwardly from the lower block 14 and communicates with the exterior through a material discharge opening 26 (FIG. 4). A preferably horizontally extending handle 28 is mounted on the upper pipe 18 for holding the dispensing device DD with one hand, while manipulating by holding on to the knob 22 (FIG. 2). The handle 28 is adjustable on the upper pipe 18 to accommodate, for example, the user's height. A hopper 30 is mounted on the upper block 12 for feeding a material M to the dispensing device DD, preferably from a back-supported container C via a hose H (FIGS. 1-4 and 31-33). Preferably, the hose H, hopper 30, housing 10, and upper and lower pipes 18 and 24, are made of a transparent material.

As best shown in FIG. 2, a container filling device CFD, in accordance with the present invention, is preferably suspended from an overhead or wall-mounted support structure SS (FIG. 27) and is in communication with a material storage tank MST for hands-free filling of the container C with the material M, as described below in more detail.

As best shown in FIGS. 4 and 6, the housing 10 includes a pre-measuring chamber 32 in the upper block 12, a measuring chamber 34 in the measuring module 16, a storage chamber 36 in the lower block 14, and a dispensing chamber 38 in the lower pipe 24.

A plunger 40, which is preferably free-floating, longitudally extends in the chambers 32, 34, 36, and 38 (FIGS. 6-7). A preferably inverted cone-shaped measuring valve 42 is provided on the plunger 40 for opening or restricting the flow of the material M between the measuring chamber 34 and the storage chamber 36 through an opening 43 (FIGS. 6-7). Likewise, a generally cone-shaped dispensing valve 44 is provided on the plunger 40 for opening or restricting the flow of the material M between the storage chamber 36 and the dispensing chamber 38 through an opening 45 (FIGS. 8-9). A preferably inverted cone-shaped discharge valve 46 is provided at the lower end 48 of the plunger 40 for restricting or discharging the flow of the material M from the dispensing chamber 38 through the discharge opening 26 (FIG. 6). The discharge valve 46 is preferably integral with a soil or ground engaging applicator 50.

As shown in FIG. 4, a feeder valve 52 is mounted on a shaft 54 and is biased by a spring 56 against a stop member 58 that is fixedly mounted in the upper pipe 18. The feeder valve 52 opens or restricts the flow of the material M between the hopper 30 and the measuring chamber 34 through the pre-measuring chamber 32 (FIGS. 6-7). It is noted herewith that although the feeder valve 52 is not mechanically connected with the measuring valve 42, the dispensing valve 44, and the discharge valve 46, it operates substantially simultaneously therewith, as described below in more detail. The bottom edge 53 of the feeder valve 52 is preferably beveled to ensure its proper seating on the measuring module 16 (FIG. 4).

As shown in FIG. 4, the shaft 54 extends through the stop member 58 and engages a lock spring 60 for biasing a locking mechanism shown in FIGS. 14-15, and described below in more detail.

As shown in FIG. 6, the upper end 62 of the plunger 40 is provided with an abutment member 64 for engaging and moving the feeder valve 52 upwardly thereby allowing the flow of the material M between the hopper 30 and the measuring chamber 34 (FIG. 7).

As shown in FIG. 4, the measuring valve 42 includes a surface 66 inclined at an angle of about 10-85°, and more preferably at an angle of about 65°. Likewise, the dispensing valve 44 includes an upper surface 68 inclined at an angle of about 10-85°, and more preferably at an angle of about 40°, and a lower surface 70 inclined at an angle of about 10-85°, and more preferably at an angle of about 78°. The discharge valve 46 also includes a surface 72 inclined at an angle of about 10-85°, and more preferably at an angle of about 75°. The storage chamber 36 is also preferably cone-shaped, and includes an internal surface 74 inclined at an angle of about 10-85°, and more preferably at an angle of about 78°. It is noted herewith that the inclined surface 66 of the measuring valve 42, the upper and lower inclined surfaces 68 and 70 of the dispensing valve 44, the inclined surface 72 of the discharge valve 46, and the inclined surface 74 of the storage chamber 36, have been selected to improve the flow of the material M through the various chambers without clumping, clogging, or bridging thereof. For instance, the flow of the material M from the measuring chamber 34 to the storage chamber 36 is greatly facilitated by the inclined surface 66 of the measuring valve 42. Likewise, the flow of the material M from the storage chamber 36 to the dispensing chamber 38 is greatly facilitated by the upper and lower inclined surfaces 68 and 70 of the dispensing valve 44 and the inclined surface 74 of the storage chamber 36. In the same manner, the flow of the material M from the dispensing chamber 38 to the exterior through the discharge opening 26 is greatly facilitated by the inclined surface 72 of the discharge valve 46. The prevention or reduction in clumping or bridging of the material in the various chambers is particularly desirable when the material includes irregularly shaped pellets, or larger size granular material that tend to clump-up leading to stopping, bridging, or clogging of the device.

Figure 21:
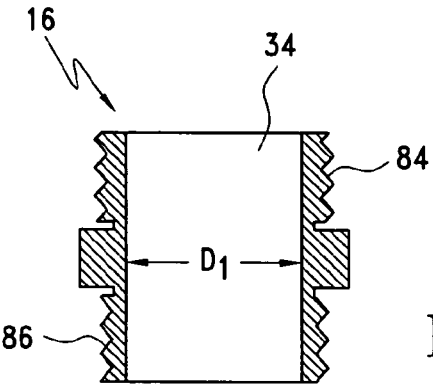
FIG. 21 illustrates an enlarged cross-sectional view of the measuring module.
Figure 22:
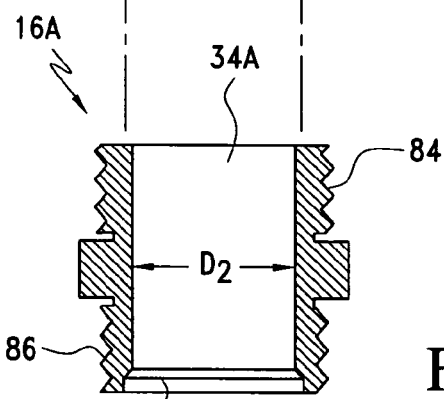
FIGS. 22-23 illustrate alternative embodiments of the measuring module shown in FIG. 21.
Figure 23:
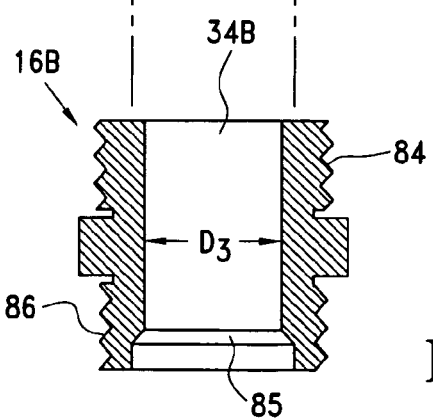

The measuring chamber 34 and the dispensing chamber 38 are preferably designed to hold substantially the same amount (charge) of material, to be dispensed in each cycle of operation, for example, 60 gm. On the other hand, the storage chamber 36 has the capacity to hold twice the amount measured or metered by the measuring chamber 34, i.e., 120 gm., but preferably holds only the measured amount of material between the measuring valve 42 and the dispensing valve 44 with almost no material in the storage chamber 36 above the measuring valve 42 (FIG. 8). As shown in FIGS. 21-23 and described below in more detail, by substituting a different size measuring module 16, a different charge of material can be dispensed. In this regard, it is noted that the size of the dispensing chamber 38 may also be varied to be consistent with the size of the measuring chamber 34.

Figures 10, 11:
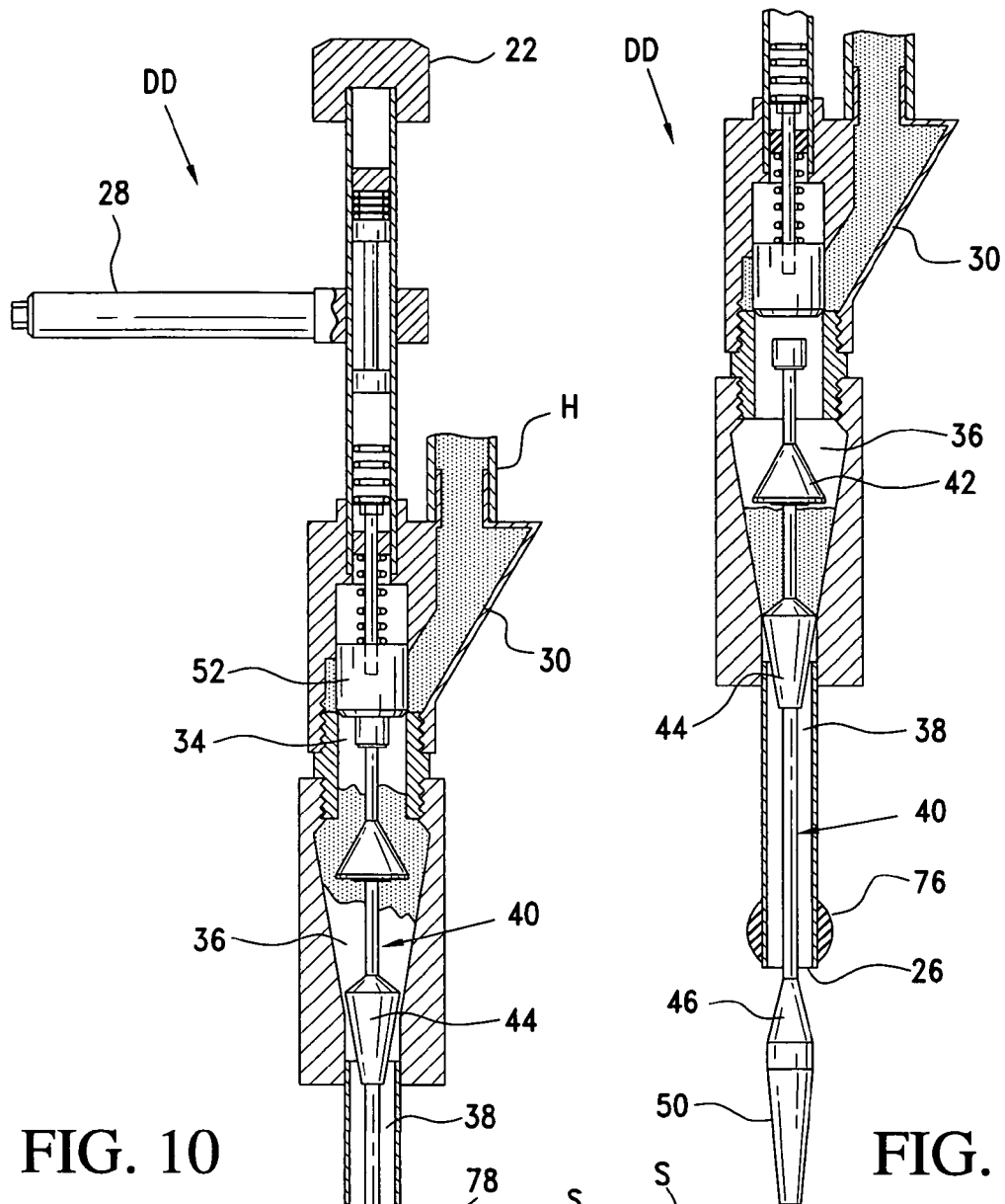

As shown in FIGS. 1 and 8-9, a preferably round collar 76 is provided on the lower pipe 24 adjacent the discharge opening 26. As the dispensing device DD is forced into the soil S, the collar 76 enlarges the hole 78 first created by the applicator 50 to accommodate the material M being dispensed (FIGS. 10-11). In this regard, it is noted herewith that the size and shape of the collar 76 can be varied to create a hole in the soil S of the desired shape, size, or configuration. In addition, the position of the collar 76 on the lower pipe 24 can be adjusted to accommodate various soil and/or material conditions.

Figure 16:
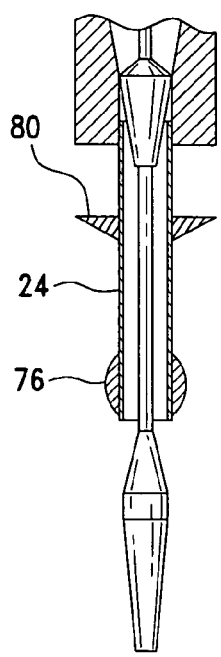
FIG. 16 is a partial view of the dispensing device of FIG. 6, shown with an optional yoke member.
Figure 17:
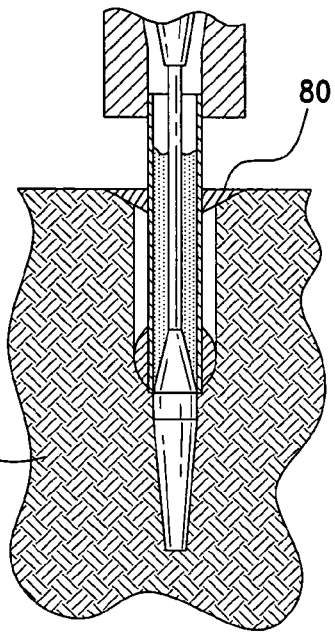
FIGS. 17-18 are views similar to FIG. 16, showing the yoke member in use.
Figure 18:
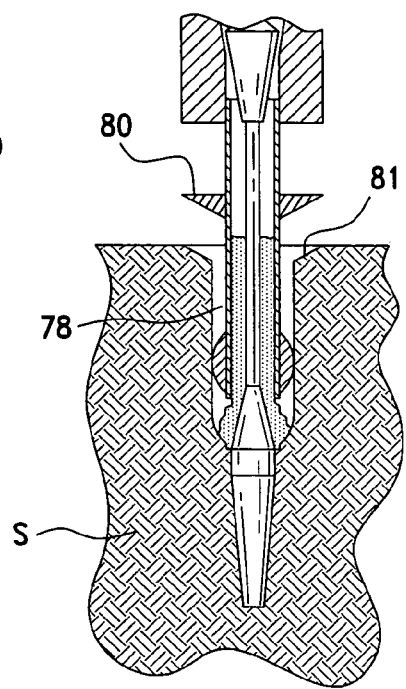

As shown in FIGS. 16-18, a preferably round, funnel-shaped yoke member 80 may be adjustably provided on the lower pipe 24 a predetermined distance above the collar 76 to compact the soil S at the top of the hole 78 to form a funnel-shaped opening or lip 81 to facilitate the downward flow of the material into the hole 78 (FIG. 18). In particular, once the device DD has been completely withdrawn away from the soil S, the material M may tend to overflow over the top of the hole 78. The lip 81 functions to direct any overflow material into and toward the center of the hole 78 due to its funnel configuration.

Figure 19:
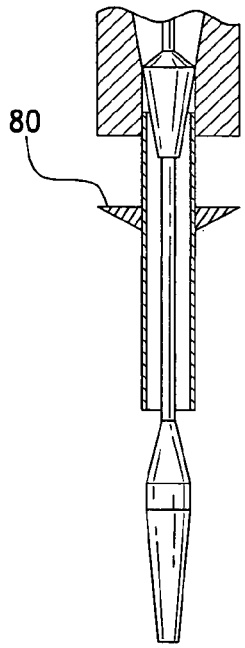
FIG. 19 is a view similar to FIG. 16, shown with the yoke member but without the collar.
Figure 20:
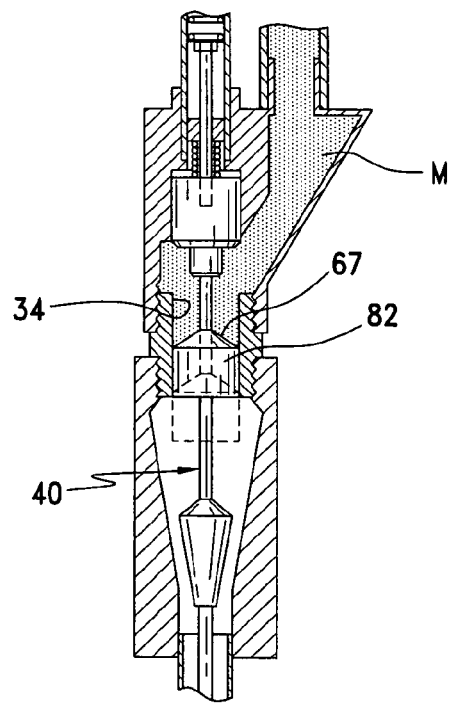
FIG. 20 is a partial view of the dispensing device shown in FIG. 6, showing an alternative embodiment of the measuring valve.

FIG. 19 illustrates an embodiment of the dispensing device DD with the yoke 80, but without the collar 76. Likewise, FIG. 20 illustrates an embodiment of the dispensing device DD wherein the measuring valve 82 is in the form of a small cylinder with an inverted cone-shaped top 67. The measuring valve 82 is adjustably mounted on the plunger 40 for varying the amount of the material M to be measured by the measuring chamber 34. For example, by sliding up valve 82 on the plunger 40, a smaller amount of the material M would be measured. On the other hand, by sliding down valve 82 (shown in broken-lines in FIG. 20), a larger amount of the material M would be measured.

FIG. 21 illustrates the preferred measuring module 16 of the invention, and FIGS. 22-23 illustrate alternative embodiments thereof having different size measuring chambers. As noted above, by varying the size of the measuring chamber 34, the quantity of the material M to be dispensed from the device DD can be varied.

In particular, FIG. 21 illustrates the preferred measuring module 16 with a measuring chamber 34 of a diameter $D_1$, which has been designed to hold or meter 60 gm. of a material. FIGS. 22-23 illustrate measuring modules 16A and 16B having measuring chambers 34A and 34B of smaller diameters $D_2$ and $D_3$, which hold 40 gm. and 30 gm. of material, respectively. Therefore, if it is desired to dispense 40 gm. of material in each cycle of operation, the measuring module 16A, shown in FIG. 22, would be used. Likewise, to dispense 60 gm. charges of material the measuring module shown in FIG. 21, would be used. On the other hand, if 30 gm. charges of material are desired to be dispensed, the measuring module 16B, shown in FIG. 23, would be used. In this regard, it is noted that the dispensing device DD is constructed to preferably discharge 60 gm. of measured material in each cycle of operation by providing the measuring module 16 of an internal diameter $D_1$. It is further noted that the valves 42, 44, 46 and 52 operate substantially simultaneously with the upward or downward movement of the plunger 40. Therefore, various lengths between the valves 42, 44, 46 and 52 have been selected to synchronize their movement to effect controlled, selective opening or closing of the openings between the hopper 30, and measuring, storage and dispensing chambers 34, 36 and 38, respectively. One of ordinary skill in the art would, therefore, appreciate that if the internal diameter of the measuring module 16, shown in FIG. 21, is reduced to discharge smaller quantities of the material, for example, 40 gm.

(FIG. 22) or 30 gm. (FIG. 23), the length or travel of measuring valve 42 relative to the feeder valve 52 would become longer due to the conical surface 66, affecting synchrony between the valves 42, 44, 46 and 52. In order to maintain the same length or travel between the measuring valve 42 and the feeder valve 52, therefore, beveled surfaces 83 and 85 are provided in the smaller measuring modules 16A and 16B, shown in FIGS. 22-23, respectively. The surfaces 83 and 85 allow the measuring valve 42 to continue its travel into the respective measuring chambers 34A and 34B, to maintain the same travel distance between the valve 42 and the feeder valve 52, thereby keeping the synchronous operation of the valves 42, 44, 46 and 52.

The measuring modules 16, 16A and 16B are provided with upper and lower sets of external screw-treads 84 and 86, respectively, which engage the corresponding internal screw-threads 88 and 90 on the upper and lower blocks, respectively (FIGS. 4 and 21-23). A measuring module of one size measuring chamber can be easily removed from the housing 10 by unscrewing the upper and lower blocks 12 and 14 in a conventional manner, and substituted by another measuring module of a different size measuring chamber. It is noted herewith that the screw-threads may be substituted by other types of fasteners for the ease of switching modules of different sizes.

Figure 24:
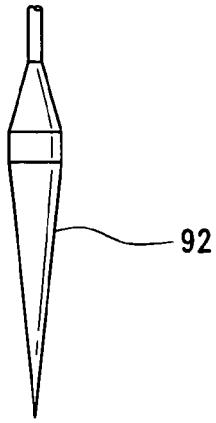
FIGS. 24-26 illustrate alternative embodiments of the applicator.
Figure 25:
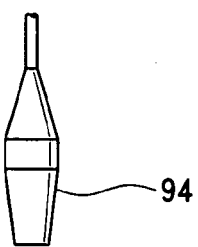
Figure 26:
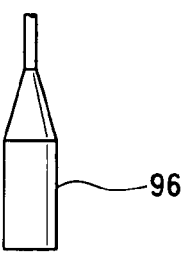

FIGS. 24-26 illustrate alternative embodiments of the applicator 50 (FIG. 3), which is generally conical in shape with a blunt end 51. In particular, FIG. 24 illustrates a pointed applicator 92 preferred for use in a dense soil where penetration could be difficult. FIG. 25 illustrates a blunt-end applicator 94 preferable for dispensing the material M above the soil where penetration is not needed or undesirable. On the other hand, the applicator 94 would be preferable for penetration below the soil where the soil lacks density and resistance is needed to force the actuator to its up position. FIG. 26 illustrates a generally cylindrically-shaped, flat-ended applicator 96 preferable for use when penetration of soil is not desired.

Figures 12, 13:
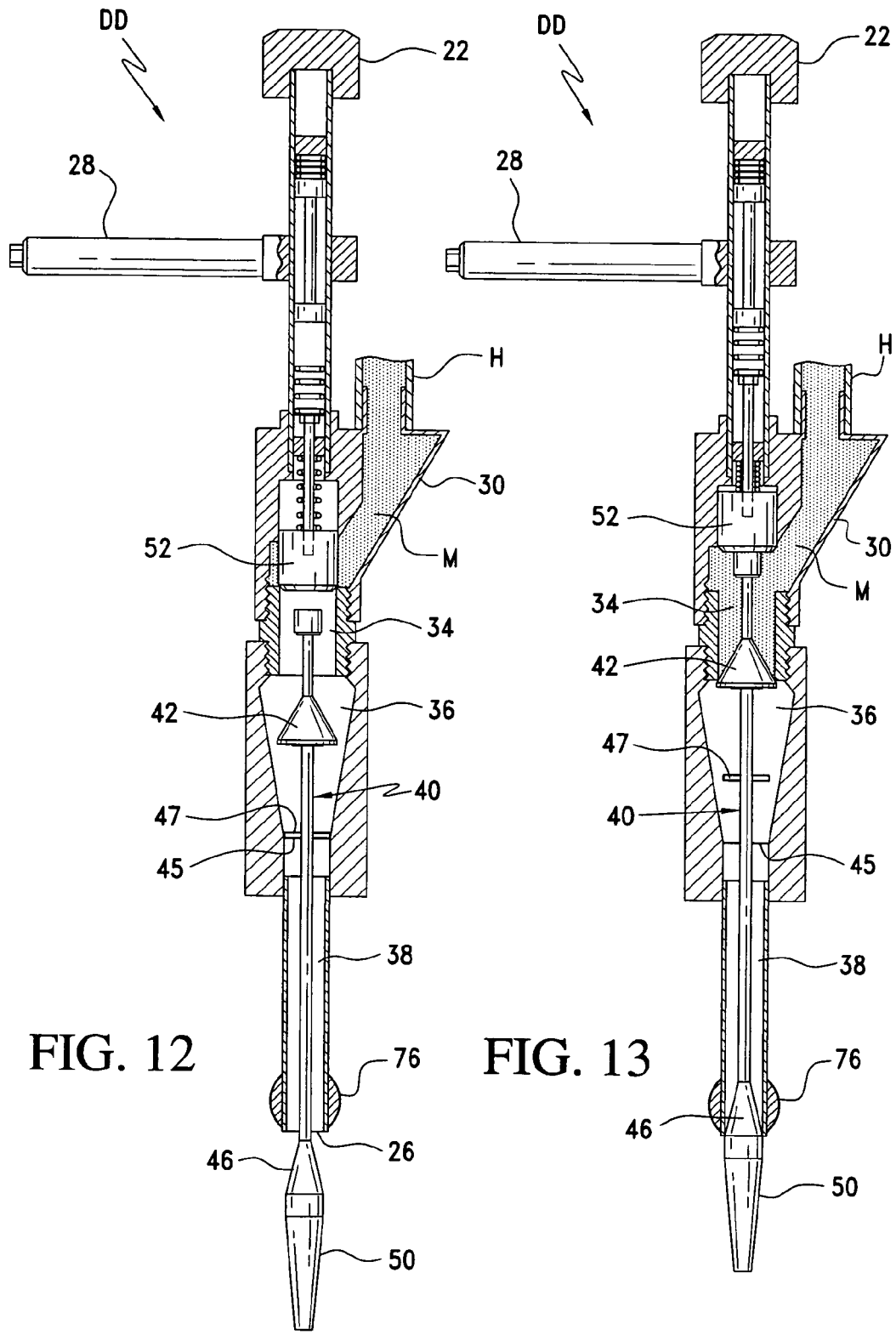
FIGS. 12-13 are views similar to FIGS. 6 and 7, respectively, showing an alternative embodiment of the dispensing device shown in FIG. 1.

FIGS. 12-13 disclose an alternative embodiment of the dispensing device DD of the invention, which is similar to the embodiment disclosed in FIGS. 1-11, with the exception that the dispensing valve is substituted by a stopper rod 47. The rod 47 comes to fit in the opening 45, but allows the material M to flow thereabout. In other words, the material M flows from the hopper 30 to the measuring chamber 34 via pre-measuring chamber 32, and into the storage chamber 36, from which it is directly dispensed to the exterior through the discharge opening 26 via the dispensing chamber 38. In other words, the material M is discharged from the device DD directly from the storage chamber 36 when the discharge valve is open. The stopper rod 47 prevents the measuring valve 42 from free-falling into the storage chamber 36 and restricting the flow of the material M between the storage chamber 36 and the dispensing chamber 38.

Figure 14:
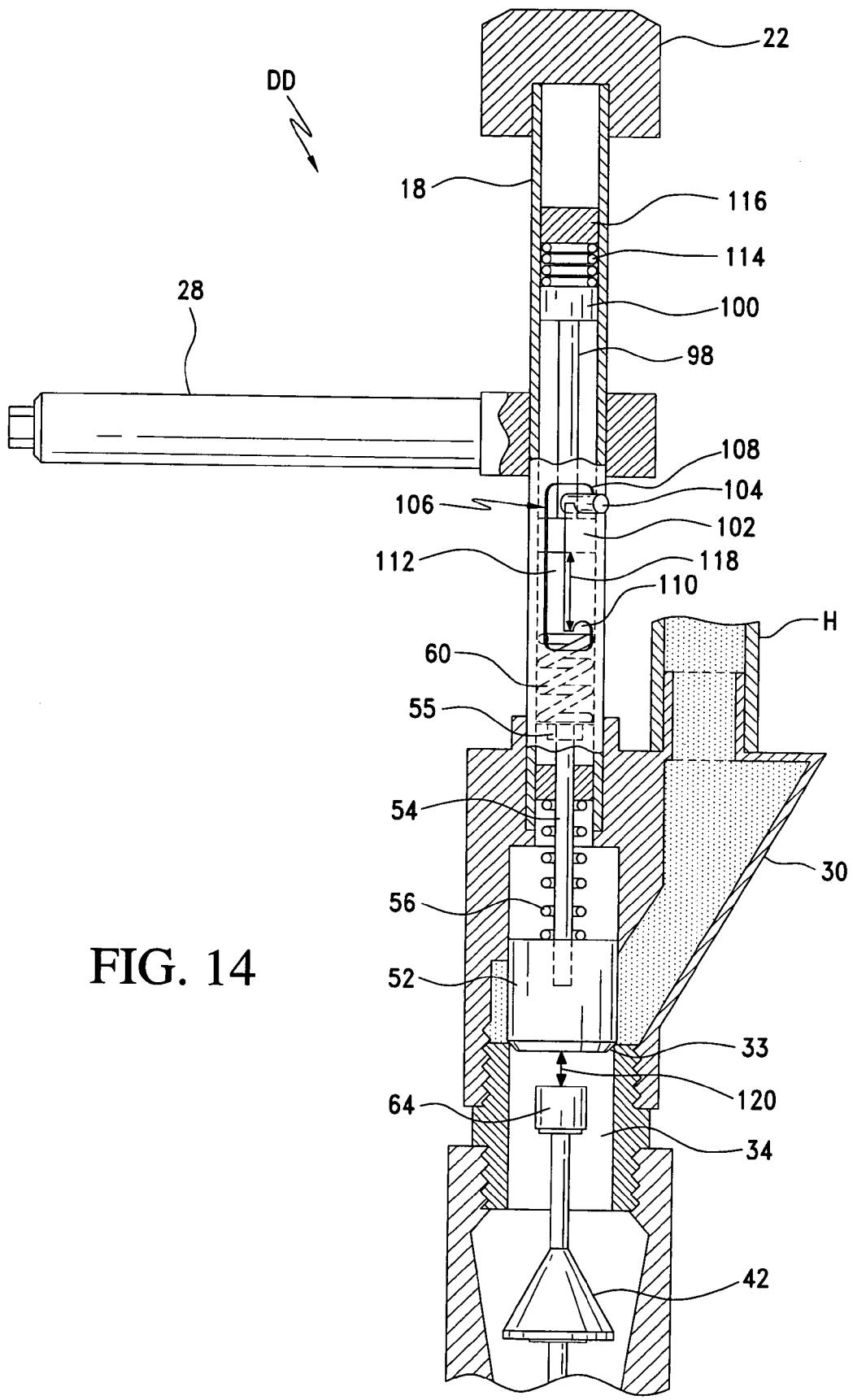
FIG. 14 illustrates a locking mechanism showing the dispensing device in an un-locked position.
Figure 15:
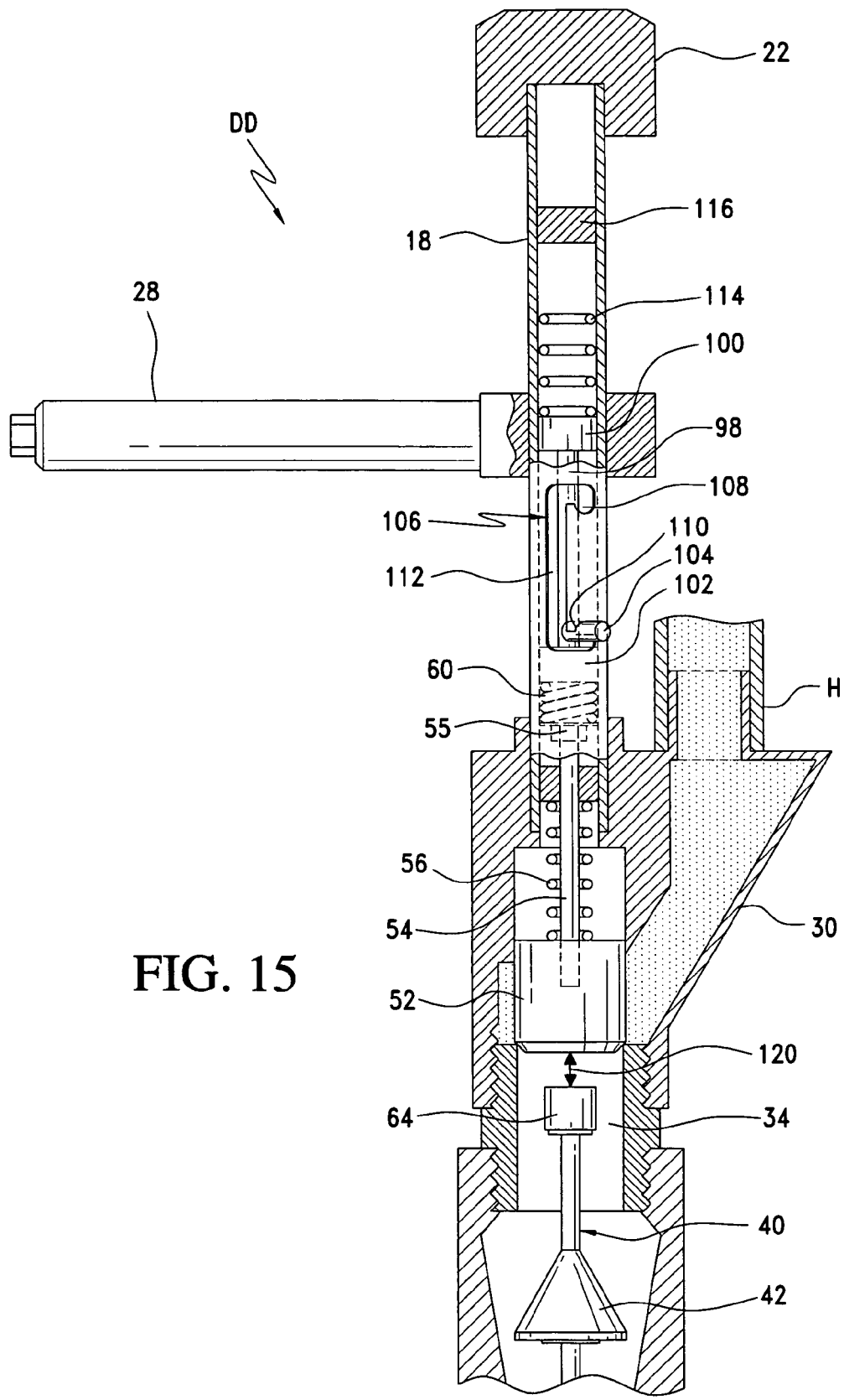
FIG. 15 is view similar to FIG. 14, showing the dispensing device in a locked position.

FIGS. 14-15 illustrate a locking mechanism for the dispensing device DD of the present invention. The locking mechanism includes a lock-rod 98 with upper and lower guide blocks 100 and 102 mounted at the ends thereof. A tab 104 is mounted on the lock-rod 98 adjacent the lower guide block 102 that extends horizontally through an elongated generally C-shaped slot 106 in the upper pipe 18. The slot 106 includes an upper unlock-notch 108 and a lower lock-notch 110 connected by a transition notch 112. The lock-rod 98 can be locked or unlocked within the upper pipe 18 by manipulating the tab 104 out of or in the unlock-notch 108 and moving through the transition notch 112 to in or out of the lock-notch 110. When the tab 104 is received in the unlock-notch 108 (FIG. 14), the lock-rod 98 abuts and compresses a spring 114 against a stop block 116 fixedly mounted within the upper pipe 18. On the other hand, when the tab 104 is positioned in the lower lock-notch 110 (FIG. 15), the lock-rod 98 abuts and compresses the lock spring 60. In the unlocked position shown in FIG. 14, the shaft 54 attached to the feeder valve 52 can move up and compress the spring 60 in the clearance 118 (FIGS. 4 and 14). This would allow the feeder valve 52 to move up and open the flow of the material M between the hopper 30 and the measuring chamber 34 via the opening 33. On the other hand, in the locked position shown in FIG. 15, the lock-spring 60 is fully compressed between the lower guide block 102 and the upper end 55 of the shaft 54. As a result, the shaft 54 cannot move up thereby preventing the feeder valve 52 from allowing the flow between the hopper 30 and the measuring chamber 34. It is noted that in this locked position, the plunger 40 also cannot move up thereby preventing the opening or closing of the measuring valve 42, dispensing valve 44, and the discharge valve 46. In this regard, it is noted herewith that the clearance 120 between the abutment member 64 and the feeder valve 52 (FIG. 15) is selected to be sufficiently small such that plunger 40 remains free-floating, yet its upward movement in the clearance 120 is negligible to allow opening or closing of any of the measuring, dispensing, or discharge valves 42, 44 and 46, to permit flow of the material thereabout. Accordingly, by positioning the tab 104 in the lower lock-notch 110, the dispensing device DD can be locked preventing its operation. On the other hand, by moving the tab 104 into the upper unlock-notch 108, the dispensing device DD can be unlocked allowing its operation (FIG. 14).

Figure 27:
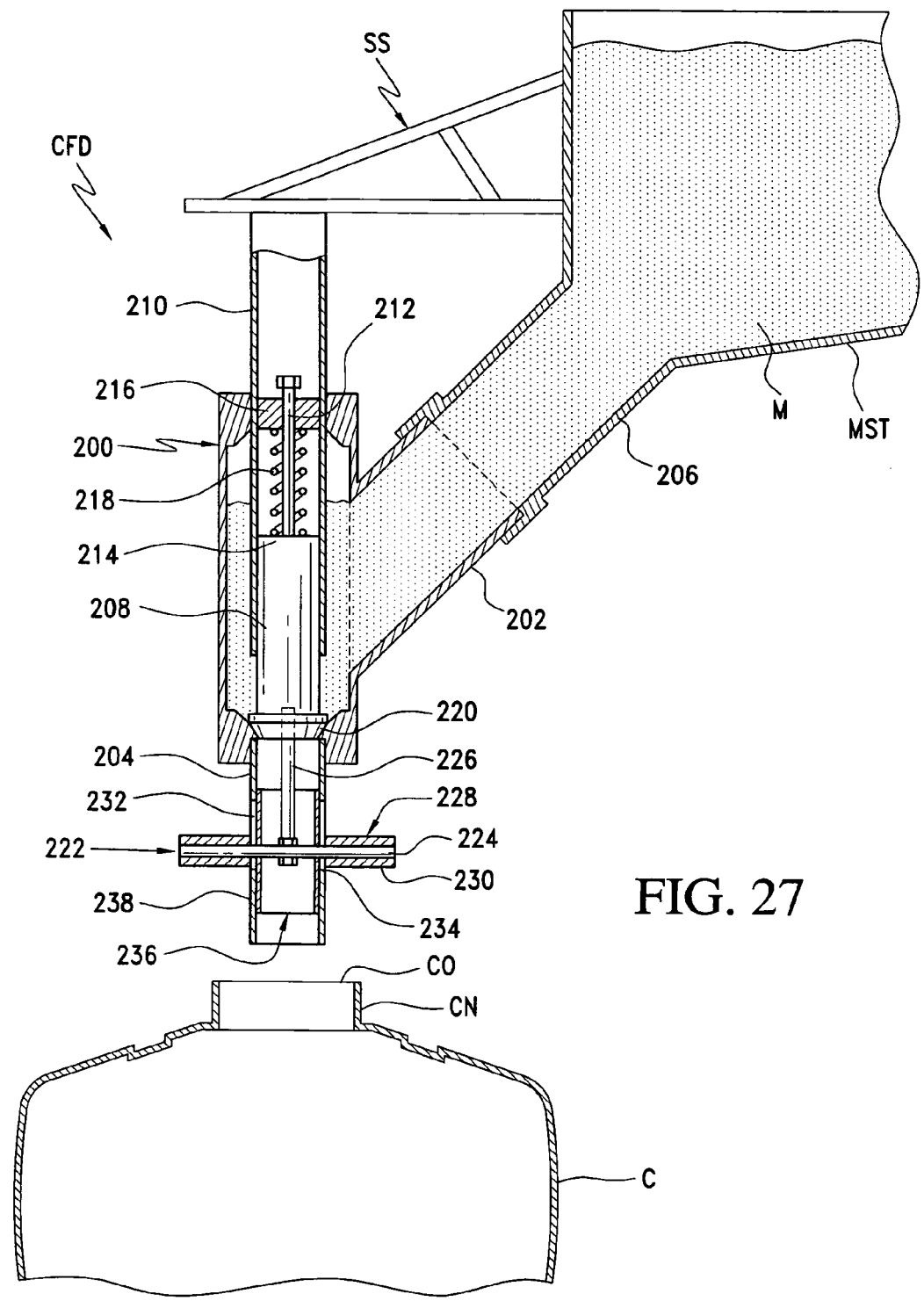
FIG. 27 is an enlarged cross-sectional view of a device for filling a container in accordance with the present invention, shown in a closed position.
Figure 28:
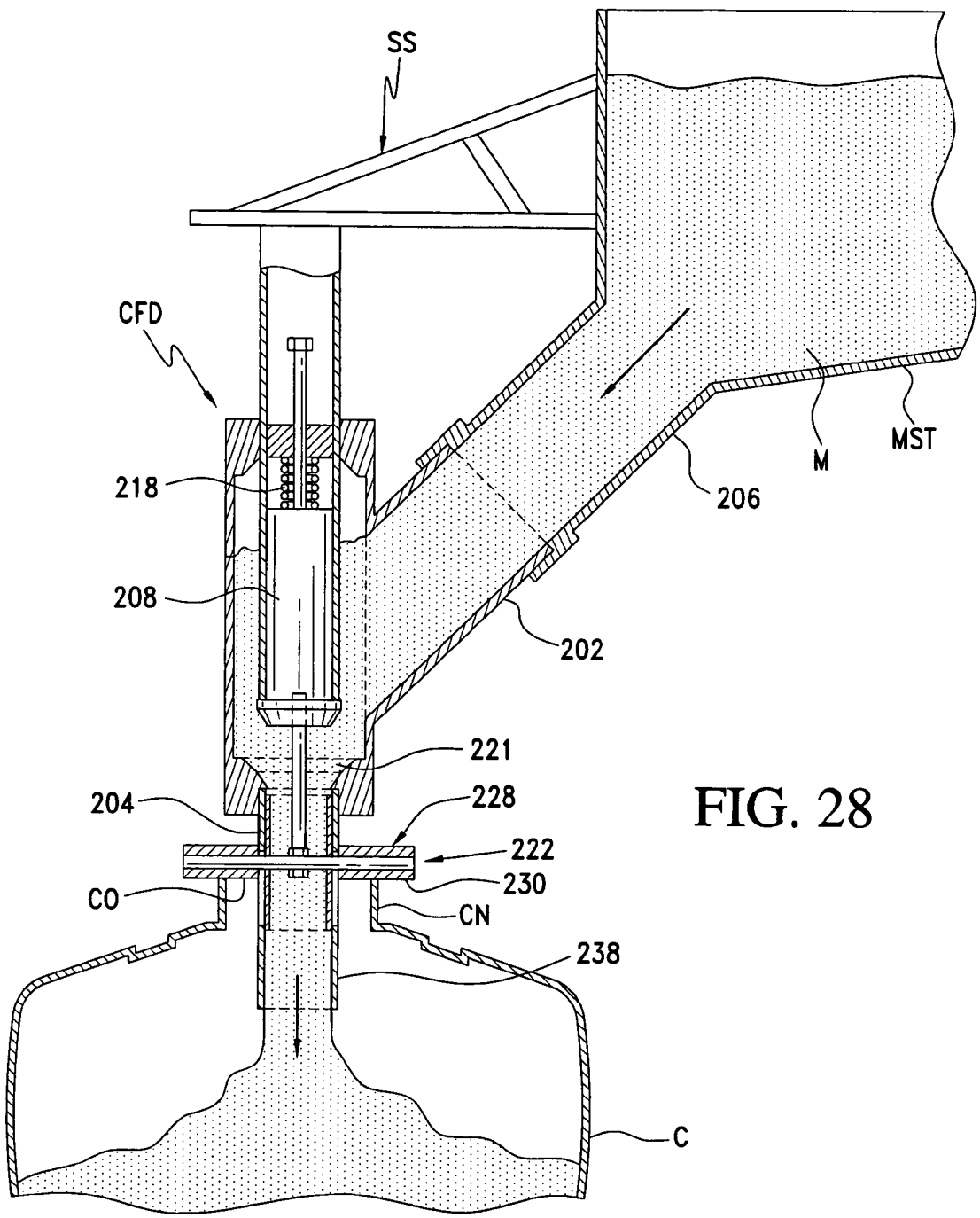
FIG. 28 is a view similar to FIG. 27, showing the filling device in an open position.
Figure 31:
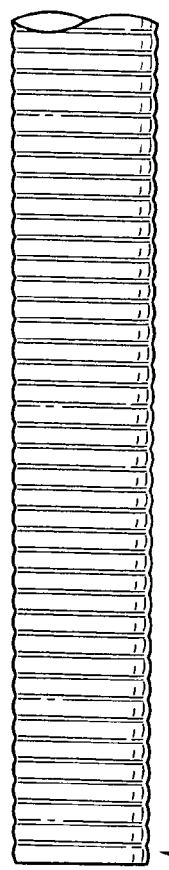
FIG. 31 is an elevational view of a hose of the present invention.

FIGS. 27-28 illustrate the container filling device CFD of the present invention, which is in the form of a housing 200 with an inlet conduit 202 and an outlet conduit 204. As shown, the device CFD is preferably suspended from an overhead support structure SS, which could be a part of an immovable structure, such as a building, or a movable structure, such as a tractor or trailer. The inlet conduit 202 is in communication with the material storage tank MST through a conduit 206. A valve 208 slides in and out of a valve housing 210, which extends from inside the housing 200 to partially outside to provide sufficient clearance for the valve 208 to operate. A shaft 212 is attached to the upper end 214 of the valve 208 and extends through a stop block 216 fixedly-mounted in the valve housing 210. A spring 218 is positioned between the upper end 214 of the valve 208 and the stop block 216 to bias the valve 208 against the stop block 216. The lower end 220 of the valve 208 is constructed to open or close an opening 221 between the inlet conduit 202 and the outlet conduit 204 (FIG. 28).

A valve actuator mechanism 222 preferably includes a rod 224 extending horizontally through the outlet conduit 204 and rigidly attached to the valve 208 by an actuator shaft 226. The rod 224 is provided in a generally round actuator plate 228. Left and right vertical slots 232 and 234 in the outlet conduit 204 allow the up and down movement of the rod 224 relative to the outlet conduit 204. An internal sleeve 236 is slidably positioned inside the outlet conduit 204 and moves up and down with the rod 224 to prevent outward flow of the material M through the slots 232 and 234.

As would be apparent to those of ordinary skill in the art that the force of the spring 218 would keep the valve 208 in the downward position to close the opening 221, thereby preventing the flow of the material M from the material storage tank MST into the outlet conduit 204. When it is desired to fill the container C with the material M, the user would bring the container adjacent the container filling device CFD in a manner that the lower end portion 238 of the outlet conduit 204 extends through the container neck CN and the container opening CO abuts the lower surface 230 of plate 228 (FIG. 28). The user would then continue to push the container C up moving the valve actuator mechanism 222 up against the force of the spring 218, thereby causing the valve 208 to move away from the opening 221. As the valve 208 withdraws from the opening 221, the material M would begin to flow by gravity from the material storage tank MST to inside the container C, via the outlet conduit 204 (FIG. 28). It is noted that as long as the user holds the container in this position, the material M would continue to flow, and once the container C is full, the flow will stop automatically since the conduit 206, the inlet conduit 202, the inside of the housing 200, the outlet conduit 204, and the container C would all be filled with the material with no open spaces. The user would than lower the container C slowly to allow the valve actuator mechanism 222 to return to its initial position by the force of the spring 218. As the valve actuator mechanism 222 moves downwardly, the valve 208 would close the opening 221 thereby preventing the flow of the material M once the container C is completely removed.

One of ordinary skill of the art would appreciate that when the container is supported on the back of a user, the user would simply need to back in under the container filling device CFD, and allow the lower end portion 238 of the outlet conduit 204 to enter the container C. By continuing to push up, the container can be filled therein quickly without having first to remove the container C from the user's back, in a hands-free manner. The filling of the container C without first having to remove from the back, saves time and reduces down-time thereby leading to a significantly more efficient filling and dispensing operation.

FIGS. 29-30 illustrate an alternative embodiment of the container filling device CFD, which is similar to the embodiment disclosed in FIGS. 27-28, with the exception that valve 208 is biased by a weight member 240. During a filling operation, the user causes the valve 208 to open by moving up the valve actuator mechanism 222 against the downward force exerted by the weight member 240. When the valve actuator mechanism 222 returns to its initial position due to withdrawal of the container C away from the container filling device CFD, the weight member 240 causes the valve 208 to slide down to close the opening 221.

Figure 32:
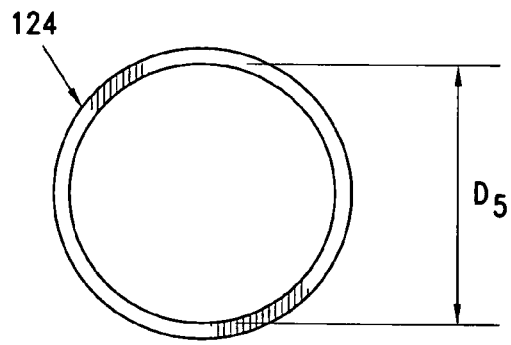
FIGS. 32-33 are upper and lower end views, respectively, of the hose of FIG. 30.
Figure 33:
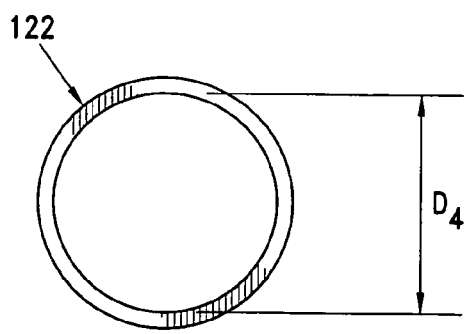

As noted above, the material M is supplied from the container C to the dispensing device DD by a hose H. As best shown in FIGS. 1-4 and 31-33, the end 122 of the hose H is connected to and is in communication with the container C through a valve 123, while the other end 124 thereof is connected to and is in communication with an inlet 31 of the hopper 30 (FIG. 4). The hose H of the present invention is designed and constructed to eliminate or substantially reduce clogging of the material that leads to the "bridging" problem associated with conventional hoses. The inside diameter of the hose H is gradually increased from the end 122 to the end 124 such that the diameter $D_5$ of the end 124 is larger than the diameter $D_4$ of the end 122 (FIGS. 32-33). As the material flows through the hose H, the inside thereof gets gradually larger. As a result, the material does not "bridge", or obstruct or stop the flow.

As shown in FIG. 2, the container C is preferably provided with a rigid frame CF for keeping it upright, when placing on a support surface or the ground, to prevent accidental spilling of the material therein.

Although not shown, the container opening CO may be provided with a diaphragm made of a rubber of the like flexible material. One or more slits would be provided in the diaphragm to allow penetration by the lower end portion 238 of the outlet conduit 204 during a filling operation. Once the container C is removed from the container filling device CFD, the diaphragm will return to its initial position to close the container opening CO to prevent spilling or outward flow of the material M from the container C. The diaphragm would also prevent moisture or other contaminants from entering into the container C that may degrade or otherwise adversely affect the material.

Operation

Referring to FIGS. 6-11, the operation of the dispensing device DD of the present invention will now be described. In the priming stages disclosed in FIGS. 6 and 7, the dispensing device DD is held in left hand by grasping the handle 28 and manipulated by holding the knob 22 in the right hand (FIG. 2). (It is noted herewith that a left-handed person can hold the dispensing device DD in a reverse order.) The tip 51 of the applicator 50 is brought to engage the ground or soil surface SF and the dispensing device DD is pushed downwardly (arrow $X_1$ in FIG. 6) therein until the discharge valve 46 closes the discharge opening 26 (FIG. 7). It is noted that as the user pushes the dispensing device DD downwardly, the plunger 40 would move up (see arrow $X_2$ in FIG. 6) until the discharge valve 46 fits into and closes off the discharge opening 26 (FIG. 7). As the plunger 40 moves from its initial position shown in FIG. 6 to the position shown in FIG. 7, the abutment member 64 will come to engage and move the feeder valve 52 upwardly thereby opening the flow of the material M between the hopper 30 and the measuring chamber 34 through the opening 33. However, the flow of the material M from the measuring chamber 34 to the storage chamber 36 would be restricted because of the measuring valve 42 closing off the opening 43 between the measuring chamber 34 and the storage chamber 36. Once the flow of the material M into the measuring chamber 34 stops, the dispensing device DD is primed and ready to operate (FIG. 7). The user then withdraws or pulls-up the dispensing device DD away from the ground or soil SF (see arrow $X_3$ in FIG. 7). As this is done, the plunger 40 moves down by gravity (see arrow $X_4$ in FIG. 7) and the measuring valve 42 no longer closes the opening 43 (FIG. 8). The material M in the measuring chamber 34 falls through the opening 43 and is received in the storage chamber 36 by gravity (FIG. 8). As the plunger 40 moves downwardly, the abutment member 64 no longer engages the feeder valve 52, which is then moved downwardly by the force of the spring 56 and closes off the opening 33 between the pre-measuring chamber 32 and the measuring chamber 34. Also, as the plunger 40 moves downwardly, the dispensing valve 44 closes-off the opening 45 between the storage chamber 36 and the dispensing chamber 38. The measured material (discharge) is now held in the storage chamber 36 (FIG. 8).

In order to dispense the material from the storage chamber 36, the user drives the applicator into the soil S (see arrow $X_5$ in FIG. 8) which again causes the plunger 40 to move up (see arrow $X_6$ in FIG. 8) such that the applicator 50 closes off the discharge opening 26 and the measuring valve 42 again closes off the opening 43 between the measuring chamber 34 and the storage chamber 36 (FIGS. 6 and 9). In this position, the dispensing valve 44 opens the flow of the material from the storage chamber 36 to the dispensing chamber 38 through the now unrestricted opening 45 between the storage chamber 36 and the dispensing chamber 38. The material from the storage chamber 36 now moves into the dispensing chamber 38 by gravity, and is held therein by the discharge valve 46 (FIG. 9). As the dispensing device DD is further advanced or pushed into the soil S, the collar 76 (whose diameter is preferably larger than the diameter of the applicator 50), enlarges the hole 78. (It is noted that in this position, shown in FIG. 9, the feeder valve 52 would open the flow of the material from the pre-measuring chamber 32 to the measuring chamber 34, in the same manner described above with respect to FIG. 6).

In order to dispense the measured material or charge now held in the dispensing chamber 38, the dispensing device DD is withdrawn from the soil S (see arrow $X_7$ in FIG. 9) allowing the plunger 40 again to drop down by gravity into the position shown in FIG. 11. As the plunger 40 drops down, the discharge valve 46 opens the discharge opening 26 thereby allowing the discharge material in the dispensing chamber 38 to flow down by gravity into the hole 78 (FIG. 10). As the device DD is withdrawn further, the material is discharged into the hole 78 (FIG. 11). The dispensing or operating cycle is now complete.

It is noted that the dispensing device DD also simultaneously gets primed or charged for the next dispensing cycle during a preceding dispensing cycle. As the plunger 40 moves downwardly from the position shown in FIG. 9 to the position shown in FIG. 11, the material M (measured by and held in the measuring chamber 34) now moves into the storage chamber 36 by gravity (FIG. 10) and is held therein by the dispensing valve 44 (FIG. 11) in the same manner, as described above with respect to FIG. 8. In order to dispense the second charge now already in the storage chamber 36, the user repeats the steps of pushing and withdrawing the dispensing device DD into the soil or ground, as noted above.

It is noted herewith that it is not necessary that the dispensing device DD be driven into the soil S to release the material from the dispensing chamber 38. In other words, once the dispensing device has been charged (FIG. 8 or 11), by pushing the applicator 50 against a hard surface, ground, or soil, and then withdrawing therefrom, the material may be applied topically.

The alternative embodiment of the dispensing device DD shown in FIGS. 12-13 operates in the same manner, except that once the dispensing device DD is primed (FIG. 13), the measured material is released directly from the measuring chamber 34 into the dispensing chamber 38 via the storage chamber 36. Accordingly, once the measuring chamber 34 is full with the material and the dispensing device DD is withdrawn from the soil or ground, the plunger 40 would move down and the material will be released from the measuring chamber 34 to the exterior through the discharge opening 26 (FIG. 13). In this embodiment, the material is not available adjacent the discharge opening 26, as in the embodiment described above with respect FIGS. 6-10, and therefore travels a longer distance from the measuring chamber 34 to the discharge opening 26. This embodiment would be used in the instances where a somewhat longer flow or dwell time for the material is desired.

From the above, one can observe that the dispensing device DD of the present invention allows for fast and repetitive dispensing of precisely measured amounts of a material above or below the soil from a container carried on the back of a user. Since the dispensing device DD is automatically primed or charged simultaneously with dispensing, in the same cycle of operation, there is no lag time in-between the dispensing cycles leading to high dispensing frequency and improved efficiency of operation.

While this invention has been described as having preferred sequences, ranges, steps, materials, structures, components, features, and/or designs, it is understood that it is capable of further modifications, uses and/or adaptations of the invention following in general the principle of the invention, and including such departures from the present disclosure as those come within the known or customary practice in the art to which the invention pertains, and as may be applied to the central features herein before set forth and fall within the scope of the invention and of the limits of the appended claims.

What I claim is:

1. A device for dispensing a predetermined amount of a material, comprising:
    a) a housing including a plurality of chambers in communication with each other;
    b) a plurality of valves for opening or restricting the flow of a material between said chambers;
    c) a first of said chambers comprising a measuring chamber;
    d) a second of said chambers comprising a storage chamber disposed downstream of said measuring chamber;
    e) a dispensing chamber disposed downstream of said storage chamber;
    f) a discharge valve operably associated with said dispensing chamber for discharging the material from said housing;
    g) a hopper for feeding the material to said measuring chamber.

2. The device of claim 1, wherein:
    a) said dispensing chamber includes a recess for holding a predetermined amount of the material to be dispensed repetitively.

3. The device of claim 1, wherein:
    a) said dispensing chamber holds a predetermined amount of the material to be dispensed repetitively.

4. The device of claim 1, wherein:
    a) said dispensing chamber holds substantially the same amount of material measured by said first chamber.

5. The device of claim 1, wherein:
    a) a first of said valves is disposed between said hopper and said measuring chamber;
    b) a second of said valves is disposed between said measuring and storage chambers;
    c) a third of said valves is disposed between said storage and dispensing chambers; and
    d) wherein said first, second and third valves, and said discharge valve operate generally simultaneously for selectively opening or restricting the flow of material from said hopper and said measuring, storage, and dispensing chambers.

6. The device of claim 5, wherein:
    a) the device includes operable and inoperable positions; and
    b) a lock for switching the device between said operable and inoperable positions.

7. The device of claim 6, wherein:
    a) said lock operably engages said first valve for the device to assume said inoperable position.

8. The device of claim 5, wherein:
    a) said second valve includes a surface inclined at an angle of about 10-85°.

9. The device of claim 8, wherein:
    a) said surface is inclined at an angle of about 65°.

10. The device of claim 5, wherein:
    a) said third valve includes first and second surfaces each inclined at an angle of about 10-85°.

11. The device of claim 10, wherein:
    a) said first surface is inclined at an angle about 40°.

12. The device of claim 10, wherein:
    a) said second surface is inclined at an angle of about 78°.

13. The device of claim 5, wherein:
a) said discharge valve includes a surface inclined at angle of about 10-85°.

14. The device of claim 13, wherein:
a) said surface is inclined at an angle of about 75°.

15. The device of claim 5, wherein:
a) said storage chamber is generally cone-shaped having an internal surface inclined an angle of about 10-85°.

16. The device of claim 15, wherein:
a) said internal surface is inclined at an angle of about 78°.

17. The device of claim 5, wherein:
a) said second and third valves and said discharge valve are rigidly connected together.

18. The device of claim 1, wherein:
a) said hopper is disposed externally of said housing.

19. The device of claim 1, further comprising:
a) an applicator disposed externally of said dispensing chamber.

20. The device of claim 19, wherein:
a) said applicator is operably connected to said discharge valve.

21. The device of claim 19, wherein:
a) said applicator includes a generally pointed end portion.

22. The device of claim 19, wherein:
a) said applicator includes a generally blunt end portion.

23. The device of claim 19, wherein:
a) said applicator includes a generally flat end portion.

24. The device of claim 1, further comprising:
a) an applicator connected to said discharge valve in a manner that said applicator remains externally of said housing at all times.

25. The device of claim 1, further comprising:
a) a collar disposed adjacent said discharge valve.

26. The device of claim 1, further comprising:
a) a yoke member disposed externally of said dispensing chamber for facilitating flow of the material.

27. The device of claim 1, further comprising:
a) an applicator disposed externally of said dispensing chamber.

28. The device of claim 27, wherein:
a) said applicator includes a generally pointed, generally blunt, or generally flat end portion.

29. A device for repetitively dispensing a predetermined amount of a material above or below a soil surface, comprising:
a) a housing including a measuring chamber, a storage chamber, and a dispensing chamber in communication with each other;
b) a plunger extending through said measuring, storage, and dispensing chambers;
c) a measuring valve for opening or restricting the flow of a material between said measuring and storage chambers;
d) a dispensing valve for opening or restricting the flow of a material between said storage and dispensing chambers;
e) a discharge valve for discharging or restricting the flow of the material out of said dispensing chamber; and
f) an applicator for engaging a soil surface during a dispensing operation.

30. The device of claim 29, wherein:
a) said storage chamber is disposed downstream of said measuring chamber.

31. The device of claim 29, wherein:
a) said measuring, dispensing, and discharge valves are connected to said plunger and operate generally simultaneously.

32. The device of claim 29, further comprising:
a) a hopper for feeding the material to said measuring chamber.

33. The device of claim 32, further comprising:
a) a feeder valve for opening or restricting the flow of the material between said hopper and said measuring chamber.

34. The device of claim 33, wherein:
a) said measuring, dispensing, and discharge valves, and said feeder valve operate generally simultaneously for selectively opening or restricting the flow of the material from said hopper and said measuring, storage, and dispensing chambers.

35. The device of claim 33, wherein:
a) the device includes operable and inoperable positions; and
b) a lock for switching the device between said operable and inoperable positions.

36. The device of claim 35, wherein:
a) said lock operably engages said feeder valve for the device to assume said inoperable position.

37. The device of claim 32, wherein:
a) said hopper is disposed externally of said housing.

38. The device of claim 29, wherein:
a) said dispensing chamber includes a recess for holding a predetermined amount of the material to be dispensed repetitively.

39. The device of claim 29, wherein:
a) said dispensing chamber holds a predetermined amount of the material to be dispensed repetitively.

40. The device of claim 29, wherein:
a) said dispensing chamber holds substantially the same amount of material measured by said measuring chamber.

41. The device of claim 29, wherein:
a) said measuring valve includes a surface inclined at an angle of about 10-85°.

42. The device of claim 41, wherein:
a) said surface is inclined at an angle of about 65°.

43. The device of claim 29, wherein:
a) said dispensing valve includes first and second surfaces each inclined at an angle of about 10-85°.

44. The device of claim 43, wherein:
a) said first surface is inclined at an angle about 40°.

45. The device of claim 43, wherein:
a) said second surface is inclined at an angle of about 78°.

46. The device of claim 29, wherein:
a) said discharge valve includes a surface inclined at angle of about 10-85°.

47. The device of claim 46, wherein:
a) said surface is inclined at an angle of about 75°.

48. The device of claim 29, wherein:
a) said storage chamber is generally cone-shaped having an internal surface inclined an angle of about 10-85°.

49. The device of claim 48, wherein:
a) said internal surface is inclined at an angle of about 78°.

50. The device of claim 29, wherein:
a) said applicator is disposed externally of said dispensing chamber.

51. The device of claim 50, wherein:
a) said applicator is operably connected to said discharge valve.

52. The device of claim 50, wherein:
a) said applicator is connected to said discharge valve in a manner that said applicator remains externally of said housing at all times.

53. The device of claim 29, wherein:
a) said applicator includes a generally pointed end portion.
54. The device of claim 29, wherein:
a) said applicator includes a generally blunt end portion.
55. The device of claim 29, wherein:
a) said applicator includes a generally flat end portion.
56. The device of claim 29, further comprising:
a) a collar disposed adjacent said discharge valve.
57. The device of claim 29, further comprising:
a) a yoke number disposed externally of said dispensing chamber for facilitating flow of the material.
58. A device for repetitively dispensing a predetermined amount of a material above or below a soil surface by automatically measuring and charging the device during each cycle of operation, the device comprising:
a) a housing including a measuring chamber, a storage chamber, and a dispensing chamber in communication with each other;
b) said storage chamber being disposed between said measuring and dispensing chambers;
c) a hopper disposed externally of said housing for feeding a material to said measuring chamber;
d) a plunger extending through said measuring, storage, and dispensing chambers and movable between first and second positions;
e) a measuring valve operably associated with said plunger for opening or restricting the flow of the material between said measuring and storage chambers;
f) a dispensing valve operably associated with said plunger for opening or restricting the flow of the material between said storage and dispensing chambers;
g) a discharge valve operably associated with said plunger for discharging or restricting the flow of the material out of said dispensing chamber;
h) said measuring, dispensing, and discharge valves being operable generally simultaneously when said plunger is moved between said first and second positions; and
i) an applicator for engaging a soil surface during a dispensing operation.
59. The device of claim 58, wherein:
a) said measuring valve opens the flow of the material between said measuring and storage chambers when said plunger assumes said first position.
60. The device of claim 59, wherein:
a) said dispensing valve restricts the flow of the material between said storage and dispensing chambers when said plunger assumes said first position.
61. The device of claim 60, wherein:
a) said discharge valve discharges the material out of said dispensing chamber when said plunger assumes said first position.
62. The device of claim 58, wherein:
a) said measuring valve restricts the flow of the material between said measuring and storage chambers when said plunger assumes said second position.
63. The device of claim 62, wherein:
a) said dispensing valve opens the flow of the material between said storage and dispensing chambers when said plunger assumes said second position.
64. The device of claim 63, wherein:
a) said discharge valve restricts the flow of the material out of said dispensing chamber when said plunger assumes said second position.
65. The device of claim 58, wherein:
a) said plunger in said second position thereof operates said feeder valve thereby opening the flow of the material from said hopper to said measuring chamber.
66. The device of claim 58, wherein:
a) said plunger is free-floating in said housing.
67. The device of claim 58, wherein:
a) said dispensing chamber includes a recess to hold only a single charge of the material to be dispensed in one cycle of operation.
68. The device of claim 67, wherein:
a) the single charge comprises substantially the amount of material measured by said measuring chamber.
69. The device of claim 58, wherein:
a) said applicator is operably connected to said discharge valve.
70. The device of claim 58, wherein:
a) said applicator is connected to said discharge valve in a manner that said applicator remains externally of said housing at all times.
71. The device of claim 58, further comprising:
a) a collar disposed adjacent said discharge valve;
b) said applicator penetrates a soil surface to form a hole in the soil when the device is pushed therein; and
c) said collar enlarges the hole in the soil as said applicator is advanced into the soil.
72. The device of claim 58, further comprising:
a) a yoke member disposed about said dispensing chamber and upstream of said applicator;
b) said applicator penetrates a soil surface to form a hole with an opening in the soil when the device is pushed therein; and
c) said yoke member compacts the opening as said applicator is advanced into the soil.
73. The device of claim 72, wherein:
a) said yoke member is generally funnel-shaped; and
b) said yoke member compacts the opening into a generally funnel-shaped opening for facilitating the flow of the material into the hole.
74. The device of claim 72, wherein:
a) the position of said yoke member is adjustable relative to said applicator.
75. A device for repetitively dispensing a predetermined amount of a material above or below a soil surface, comprising:
a) a housing including a measuring chamber and a dispensing chamber in communication with each other;
b) a hopper for feeding a material to said measuring chamber;
c) a plunger extending through said measuring and dispensing chambers and movable between first and second positions;
d) a feeder valve for opening or restricting the flow of the material between said hopper and said measuring chamber;
e) a measuring valve operably associated with said plunger for opening or restricting the flow of the material between said measuring and dispensing chambers;
f) a discharge valve operably associated with said plunger for discharging or restricting the flow of the material out of said dispensing chamber; and
g) an applicator for engaging a soil surface during a dispensing operation.
76. The device of claim 75, wherein:
a) said plunger is free-floating in said housing.
77. The device of claim 76, wherein:
a) said housing includes a material feeding end and a material discharge end;
b) said plunger in said first position thereof moves toward said discharge end of said housing; and c) said plunger in said second position thereof moves toward said feeding end of said housing.

78. The device of claim 77, wherein:
a) said feeder valve opens the flow of the material between said hopper and said measuring chamber when said plunger assumes said second position; and
b) said measuring valve and said discharge valve restrict the flow of the material out of said measuring and dispensing chambers, respectively, when said plunger assumes said second position.

79. The device of claim 78, wherein:
a) said feeder valve restricts the flow of the material between said hopper and said measuring chamber when said plunger assumes said first position; and
b) said measuring valve and said discharge valve open the flow of the material out of said measuring and dispensing chambers, respectively, when said plunger assumes said first position.

80. The device of claim 75, wherein:
a) said measuring and discharge valves operate generally simultaneously.

81. The device of claim 75, wherein:
a) said hopper is disposed externally of said housing.

82. A device for repetitively dispensing a predetermined amount of material above or below a soil surface, comprising:
a) a dispenser for measuring and dispensing a material;
b) a container for carrying the material;
c) a conduit for supplying the material from said container to said dispenser;
d) said conduit including first and second ends operably connected to said container and said dispenser, respectively;
e) the inside diameter of said second end being larger than the diameter of said first end; and
f) said dispenser, comprising:
  i) a housing including a plurality of chambers in communication with each other;
  ii) a plurality of valves for opening or restricting the flow of the material between said chambers;
  iii) a first of said chambers comprising a measuring chamber;
  iv) a second of said chambers comprising a storage chamber disposed downstream of said first chamber;
  v) a dispensing chamber disposed downstream of said storage chamber; and
  vi) a discharge valve operably associated with said dispensing chamber for discharging the material from said housing.

83. The device of claim 82, wherein:
a) the inside diameter of said conduit increases gradually from said first end to said second end thereof.

84. The device of claim 82, wherein:
a) the container comprises a back-supported container.

85. A device for repetitively dispensing a predetermined amount of a material above or below a soil surface, comprising:
a) a dispenser for measuring and dispensing a material;
b) a container for carrying the material;
c) a conduit for supplying the material from said container to said dispenser;
d) said conduit including first and second ends operably connected to said container and said dispenser, respectively;
e) the inside diameter of said second end being larger than the diameter of said first end; and
f) said dispenser, comprising:
  i) a housing including a measuring chamber, a storage chamber, and a dispensing chamber in communication with each other;
  ii) a plunger extending through said measuring, storage, and dispensing chambers;
  iii) a measuring valve for opening or restricting the flow of the material between said measuring and storage chambers;
  iv) a dispensing valve for opening or restricting the flow of the material between said storage and dispensing chambers;
  v) a discharge valve for discharging or restricting the flow of the material out of said dispensing chamber; and
  vi) an applicator for engaging a soil surface during a dispensing operation.

86. The device of claim 85, wherein:
a) the inside diameter of said conduit increases gradually from said first end to said second end thereof.

87. The device of claim 85, wherein:
a) the container comprises a back-supported container.

88. A method of repetitively dispensing a predetermined amount of a material above or below a soil surface by automatically measuring and charging a device during each cycle of operation, comprising the steps of:
a) providing a device including:
  i) measuring, storage, and dispensing chambers in communication with each other;
  ii) a plunger extending through the measuring, storage, and dispensing chambers and movable between first and second positions;
  iii) an applicator operably connected to the plunger for engaging a soil surface during a dispensing operation; and
  iv) a hopper for feeding a material to the measuring chamber;
b) feeding a material to the measuring chamber by moving the plunger to the second position;
c) measuring the material and holding in the measuring chamber;
d) moving the measured material into the storage chamber by moving the plunger to the first position;
e) moving the measured material from the storage chamber to the dispensing chamber by moving the plunger to the second position; and
f) dispensing the material from the device by moving the plunger to the first position.

89. The method of claim 88, comprising:
recharging the device for a next dispensing cycle by:
  i) repeating steps b) and c) generally simultaneously with step e); and
  ii) repeating step d) generally simultaneously with step f).

90. The method of claim 89, wherein:
steps b) -c) and d) are repeated automatically generally simultaneously with steps e) and f), respectively, as the plunger moves between the first and second positions.

91. The method of claim 88, wherein:
the plunger is moved from the first position to the second position by engaging the applicator with a surface and moving the device toward the surface; and
the plunger is moved from the second position to the first position by withdrawing the device from the surface as the plunger moves by gravity.

92. The method of claim 91, wherein:
the plunger moves between the first and second positions by free floating in the device.

93. A method of repetitively dispensing a predetermined amount of a material above or below a soil surface by automatically measuring and charging a device during each cycle of operation, comprising the steps of:
- a) providing a device including:
  - i) measuring and dispensing chambers in communication with each other;
  - ii) a free-floating plunger extending through the measuring and dispensing chambers and movable between first and second positions;
  - iii) an applicator operably connected to the plunger for engaging a surface during a dispensing operation; and
  - iv) a hopper for feeding a material to the measuring chamber;
- b) feeding a material to the measuring chamber by moving the plunger to the second position;
- c) measuring the material and holding in the measuring chamber;
- d) moving the measured material from the measuring chamber to the dispensing chamber and dispensing therefrom by moving the plunger to the first position.

94. The method of claim 93, comprising:
recharging the device for a next dispensing cycle by:
- i) repeating steps b) and c) generally simultaneously with step d).

95. The method of claim 94, wherein:
steps b) and c) are repeated automatically generally simultaneously with step d) as the plunger moves between the first and second positions.

96. The method of claim 93, wherein:
the plunger is moved from the first position to the second position by engaging the applicator with a surface and moving the device toward the surface; and
the plunger is moved from the second position to the first position by withdrawing the device from the surface as the plunger moves by gravity.

97. A device for dispensing a predetermined amount of a material, comprising:
- a) a housing including a plurality of chambers in communication with each other;
- b) a plurality of valves for opening or restricting the flow of a material between said chambers;
- c) a first of said chambers comprising a measuring chamber;
- d) a second of said chambers comprising a storage chamber disposed downstream of said measuring chamber;
- e) a dispensing chamber disposed downstream of said storage chamber for holding substantially the same amount of material measured by said first chamber; and
- f) a discharge valve operably associated with said dispensing chamber for discharging the material from said housing.

* * * * *